(12) United States Patent
Guntert, Jr. et al.

(10) Patent No.: US 11,186,958 B2
(45) Date of Patent: *Nov. 30, 2021

(54) MATERIAL PLACER AND HIGH VOLUME SUPPLY HOPPER

(71) Applicant: Guntert & Zimmerman Const. Div., Inc. (005430), Ripon, CA (US)

(72) Inventors: Ronald M. Guntert, Jr., Stockton, CA (US); Iovtcho Delev, Stockton, CA (US)

(73) Assignee: Guntert & Zimmerman Const. Div., Inc., Ripon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/008,426

(22) Filed: Aug. 31, 2020

(65) Prior Publication Data

US 2020/0392675 A1    Dec. 17, 2020

Related U.S. Application Data

(63) Continuation of application No. 16/220,503, filed on Dec. 14, 2018, now Pat. No. 10,760,226.
(Continued)

(51) Int. Cl.
*E01C 19/00* (2006.01)
*E01C 19/20* (2006.01)
(Continued)

(52) U.S. Cl.
CPC ............ *E01C 19/2045* (2013.01); *B60P 1/38* (2013.01); *E01C 19/182* (2013.01);
(Continued)

(58) Field of Classification Search
CPC .............. E01C 19/182; E01C 19/2045; E01C 2019/2075; E01C 2019/209; E01C 2301/04
(Continued)

(56) References Cited

U.S. PATENT DOCUMENTS

| 3,583,646 A | 6/1971 | Bogenschutz |
| 3,592,556 A | 7/1971 | Campbell |

(Continued)

FOREIGN PATENT DOCUMENTS

EP    0102681    3/1984

OTHER PUBLICATIONS

U.S. Appl. No. 16/220,503, "Non-Final Office Action", dated Dec. 23, 2019, 14 pages.
(Continued)

*Primary Examiner* — Raymond W Addie
(74) *Attorney, Agent, or Firm* — Kilpatrick Townsend & Stockton

(57) ABSTRACT

A material placer having an augmented hopper, which can receive and convey concrete or other material at a greater rate than other material placers known in the industry. The augmented hopper has a relatively large volume, a bumper structure, a hinged flop gate, and a sliding gate plate that improves the process of receiving concrete or other discharged material from delivery trucks. The hinged flop gate and/or the sliding plate can optionally be vibrated to aid in moving concrete or other material into the trough of the augmented hopper. The material placer is further configured to have ease of access for cleaning and maintenance.

13 Claims, 17 Drawing Sheets

Related U.S. Application Data

(60) Provisional application No. 62/612,194, filed on Dec. 29, 2017.

(51) Int. Cl.
  B60P 1/38 (2006.01)
  E01C 19/18 (2006.01)

(52) U.S. Cl.
  CPC .................. *E01C 2019/209* (2013.01); *E01C 2019/2075* (2013.01); *E01C 2301/04* (2013.01)

(58) Field of Classification Search
  USPC ...................... 404/84.05–84.8, 101–111, 118
  See application file for complete search history.

(56) References Cited

U.S. PATENT DOCUMENTS

| | | | |
|---|---|---|---|
| 3,967,912 A * | 7/1976 | Parker | E01C 19/4873 404/84.05 |
| 4,012,160 A * | 3/1977 | Parker | E01C 19/4873 404/84.05 |
| 4,343,389 A | 8/1982 | Ponstein | |
| 4,676,690 A | 6/1987 | Allen | |
| 5,100,277 A | 3/1992 | Musil | |
| 5,642,961 A | 7/1997 | Campbell | |
| 5,722,790 A | 3/1998 | Spray | |
| 6,079,901 A * | 6/2000 | Banks | E01C 19/48 239/128 |
| 8,016,516 B2 * | 9/2011 | Johnson | E01C 23/06 404/108 |
| 9,777,442 B2 | 10/2017 | Weiler et al. | |
| 2010/0158608 A1 | 6/2010 | Wilson, Sr. | |
| 2011/0236129 A1 | 9/2011 | Guntert, Jr. et al. | |
| 2015/0166274 A1 | 6/2015 | Swearingen | |
| 2015/0247294 A1 | 9/2015 | Weiler et al. | |
| 2016/0115654 A1 | 4/2016 | Pedersen et al. | |
| 2016/0176650 A1 | 6/2016 | Brown | |
| 2018/0105116 A1 | 4/2018 | Neisen | |

OTHER PUBLICATIONS

U.S. Appl. No. 16/220,503, "Notice of Allowance", dated Apr. 30, 2020, 5 pages.
PCT/US2018/068022, "International Preliminary Report on Patentability", dated Jul. 9, 2020, 9 pages.
PCT/US2018/068022, "International Search Report and Written Opinion", dated Mar. 14, 2019, 10 pages.

* cited by examiner

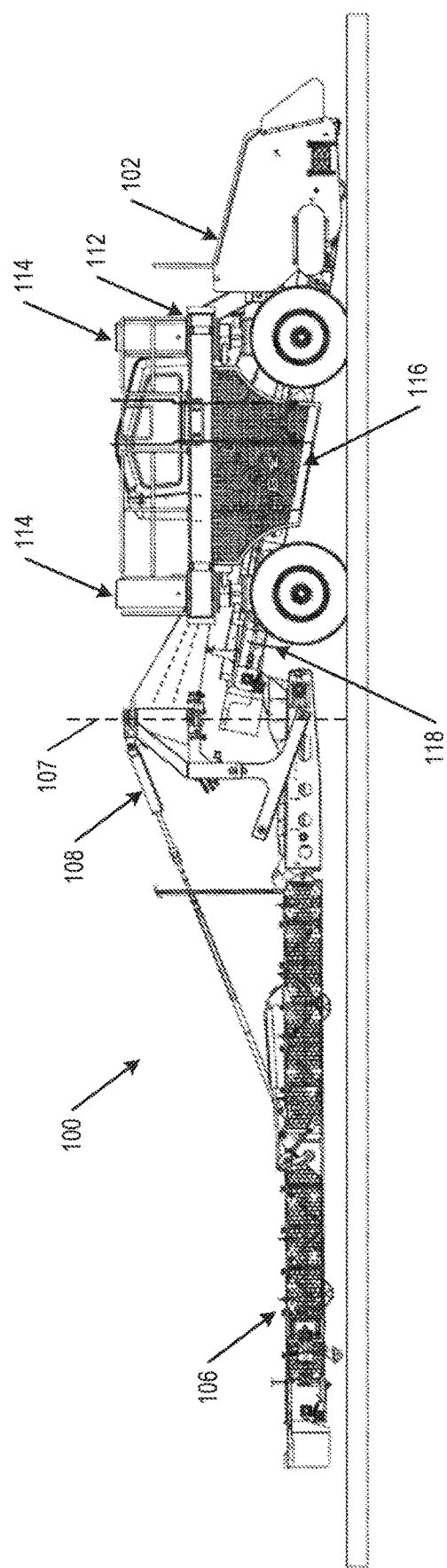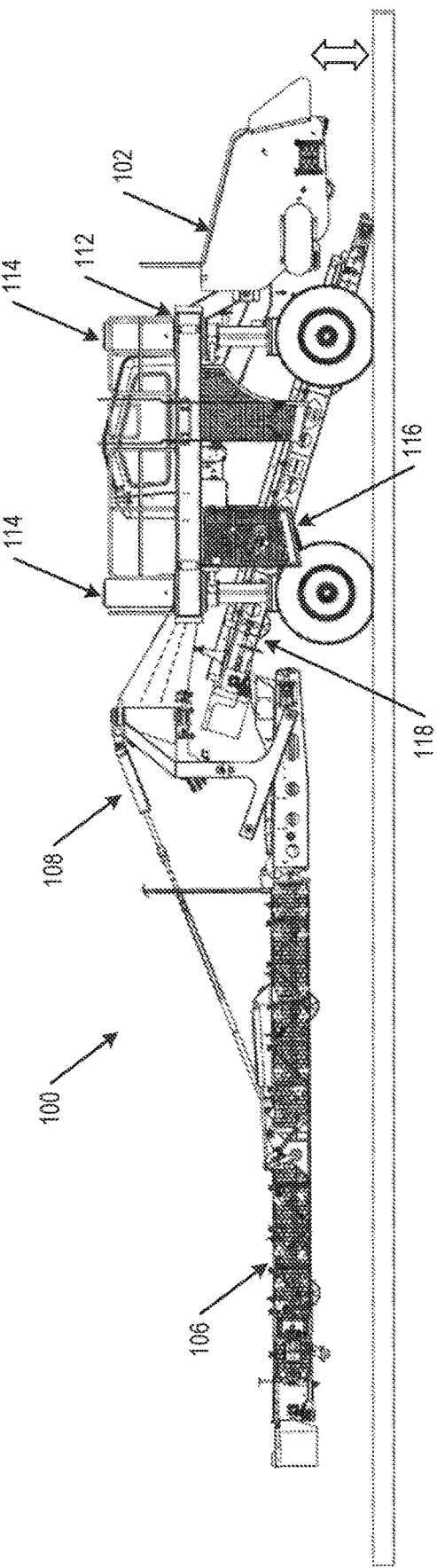

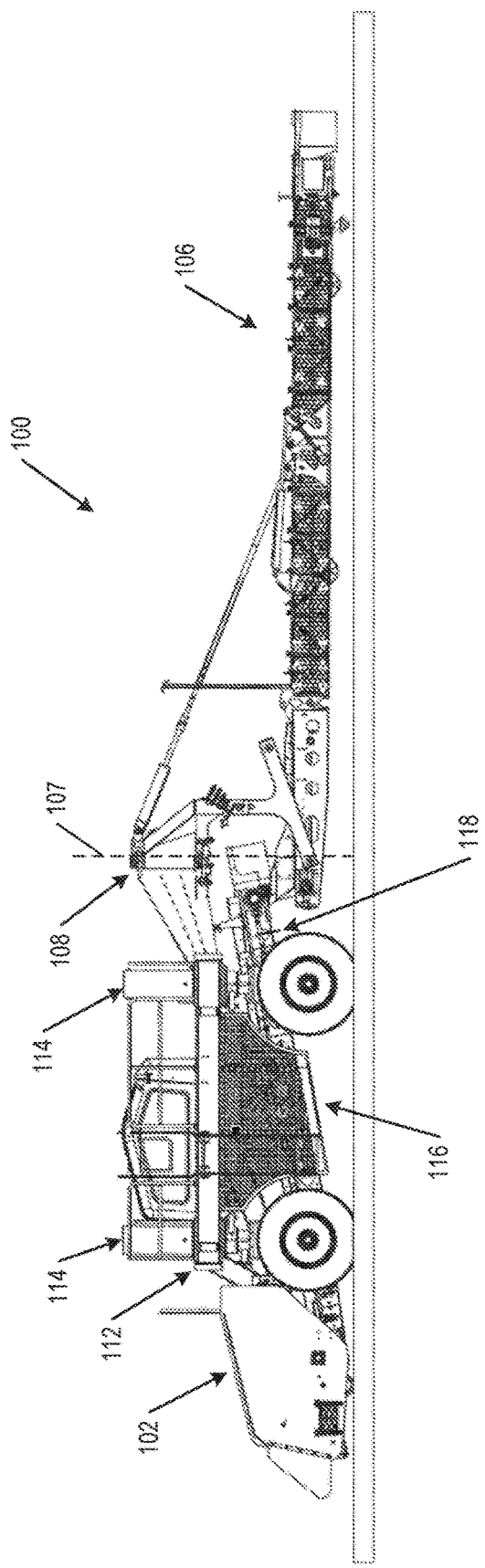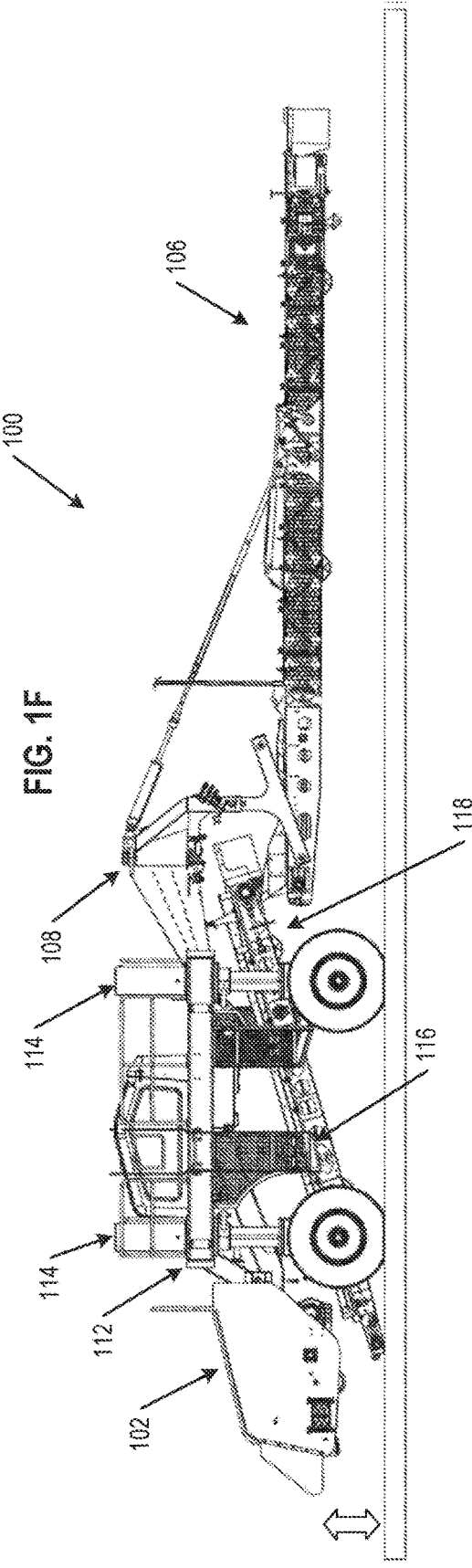

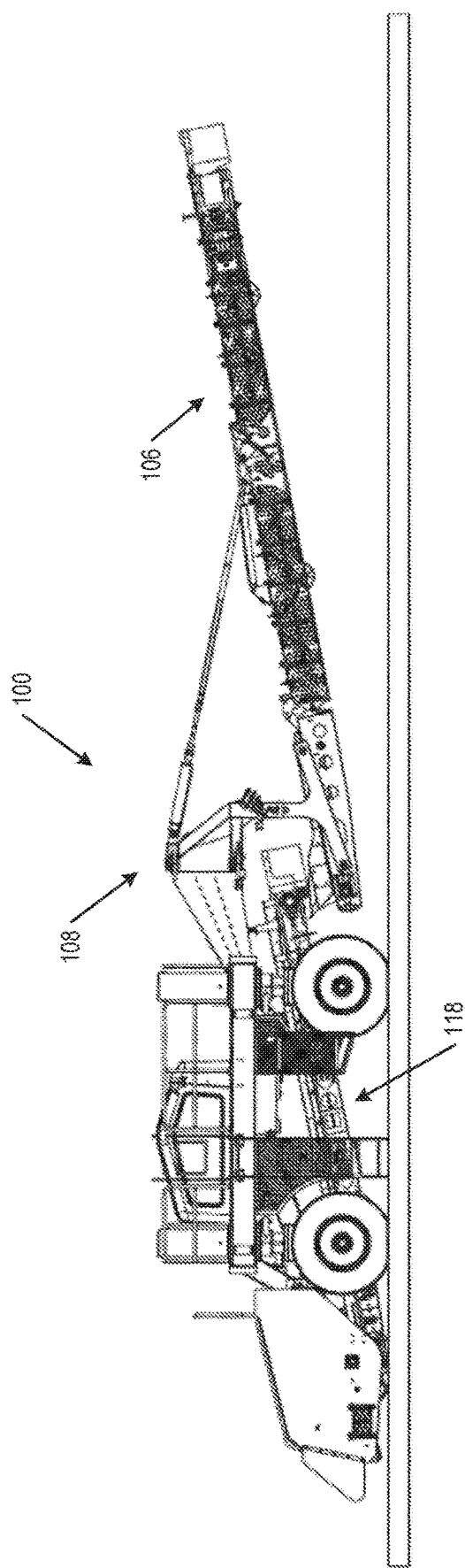

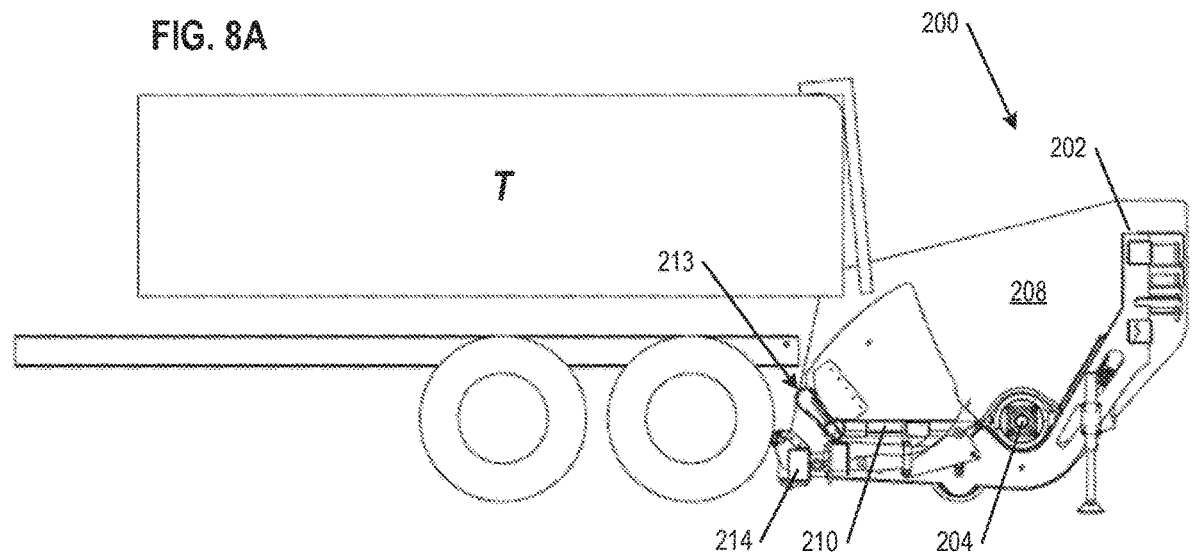
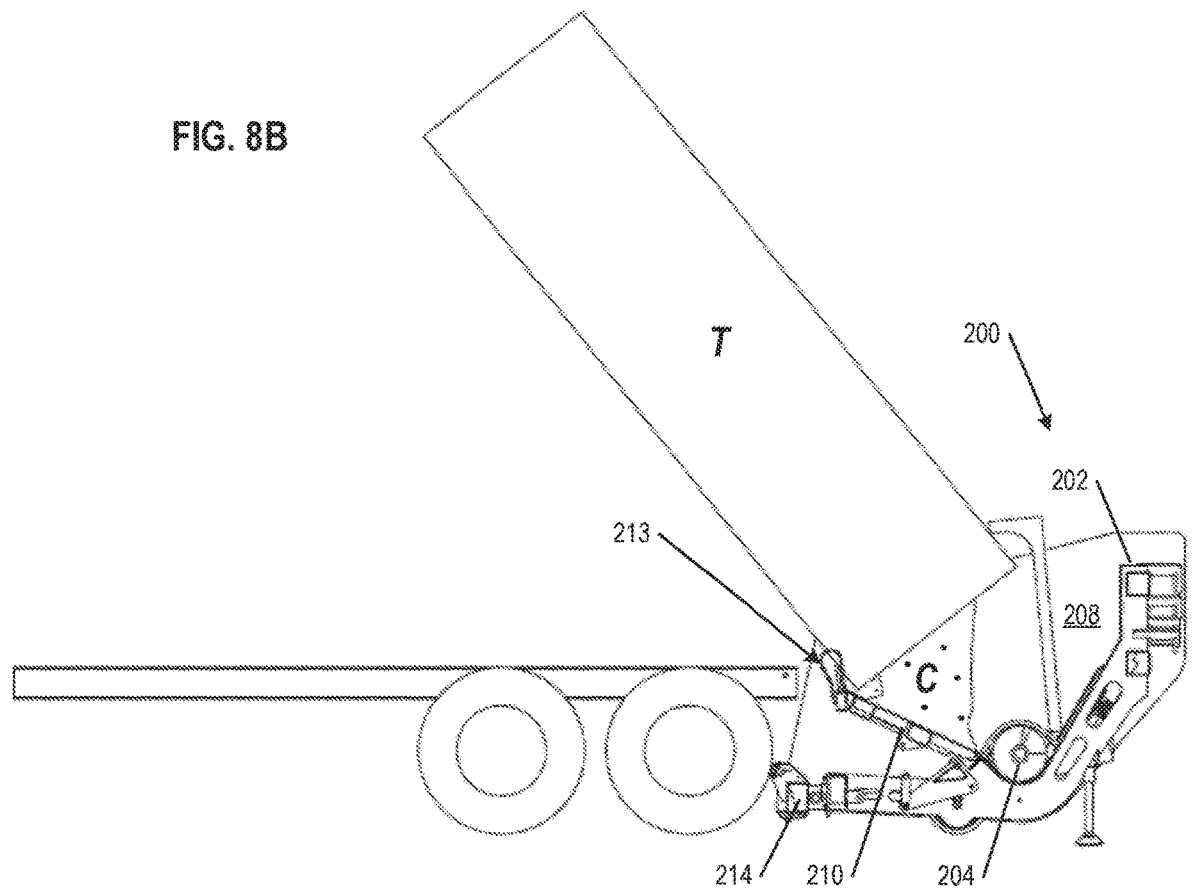

MATERIAL PLACER AND HIGH VOLUME SUPPLY HOPPER

CROSS-REFERENCES TO RELATED APPLICATIONS

This application is a Non-provisional of U.S. patent application Ser. No. 16/220,503 filed Dec. 14, 2018, which claims the benefit of priority to U.S. Provisional Application No. 62/612,194, entitled "MATERIAL PLACER AND HIGH VOLUME SUPPLY HOPPER" and filed on Dec. 29, 2017, the entirety of which is herein incorporated by reference.

FIELD OF THE INVENTION

This disclosure relates to construction vehicles referred to as material placers which receive fresh concrete, crushed concrete, aggregate, asphalt, roller-compacted concrete ("RCC"), soil cement, concrete slurry, or other granular materials and then transfers the material to another place or construction vehicle, or places that concrete material in a machine-mounted hopper or on the ground in advance of any type of road-paving machine. The applications are varied and significant.

BACKGROUND

Slipform pavers are generally well-known and are produced and widely distributed, for example, by the applicant and assignee of this patent application. Slipform pavers are not only used to slipform fresh concrete but also used to place other granular materials described above.

Road building machines typically do not carry their own concrete or materials to pave. Rather, apparatuses such as material placers are used for receiving trucks hauling the materials to be delivered in bulk then, metering this material to the material placer on board belt(s) which in turn transfers the material and controls the delivery rate to something or someplace else. In the case of a road building machine, the material placer distributes the materials over an area that will be paved or onto a road paver hopper, and then the road paver building machine forms this material into long strips. This paved material is often used in the context of projects for forming the base and concrete on highways, airport runways, and the like. In this manner, the pavers are continuously supplied with fresh material as they travel in the direction of the strip. The road building machines form the freshly supplied material into a rectangular, cross-sectional shape, and then properly pre-compacts or compacts and finishes the top surface of the strip. Other road construction related machines, such as barrier wall forming machines or asphalt base laying machines, can also be fed with such material placers. Materials that are placed by such machines can include, but are not limited to, concrete, gravel, sand, asphalt, bitumen, slurries of various composition, and the like.

Accordingly, the placing of material can be a bottleneck point, where the road building process is limited by factors including: (i) the rate at which the material can be provided to the material placer, (ii) the rate at which material can be loaded onto the material placer, and onto its transfer conveyor, via a hopper, and (iii) downtime of the material placer which is caused by hardening of concrete or asphalt on hard-to-access parts of the material placer (e.g. a conveyor belt).

Approaches that have attempted to improve the throughput of material placer hoppers have included the use of drag chains, extra augers, hydraulic folding hopper walls, and the like to transfer materials from the hopper to the conveyor. Other approaches include static physical extensions to a hopper, providing extra rollers or augers, and using supplementary feed hoppers to receive concrete or other materials before delivering to a primary hopper. These extra devices have been added to traditional hoppers in an attempt to have the largest practical holding capacity in the material hopper so a truck hauling material can quickly dump its load and pull away to allow the next truck to cycle. Minimizing the time necessary to dump the material load helps to achieve shorter discharge times and higher production, while still being able to move the last bit of material from the truck bed to the auger located at the back of the hopper, which in turn carries the material to the conveyor. Such approaches have been less than ideal, introducing extra equipment, failure points, moving parts, additional costs for training, maintenance, and machinery, and further complexity to concrete placing projects.

Further as noted, problems with concrete being fed through material placers is well known in the industry including downtime resulting from the accumulation of hardened concrete on parts of the equipment. For example, hardened concrete can build up on the tail pulley of the transfer conveyor, increasing its diameter then breaking a conveyor belt or freezing up rollers supporting the conveyor belt. While routine cleaning and maintenance should in theory avoid persistent breakdowns of this nature, in practice, the difficulty for an operator or laborer to reach the areas requiring cleaning located in the interior of the machine on a daily or even hourly basis results in a calculated negligence and tolerance for delays when the machine does inevitably break.

Another limitation of material placers known to the industry is that, when used on a jobsite, they are generally designed with fixed ground clearance underneath them. More specifically, with a fixed clearance between the ground and the tail pulley of the two conveyors. Only the material receiving hopper is designed to raise and lower by a limited amount, with the tail end of conveyor transferring material out of the hopper by raising and lowering with the hopper. Much like an automobile traveling on uneven or rutted ground or transitioning too quickly from flat to slope, material placers known to the industry experience the same problems, such as parts of the material placer interfering with the ground or other obstructions. The only way to overcome this limitation on an automobile or material placer is to have a higher ground clearance, or the ability to increase the ground clearance when uneven ground is encountered or when there is a need to move from a flat to a steep surface.

Examples of material placers known in the industry that exhibit aspects of the above noted problems and design deficiencies can be found, for example, in: U.S. Pat. App. Pub. No. 2006/0239806, U.S. Pat. App. Pub. No. 2009/0242316, U.S. Pat. App. Pub. No. 2008/0173736, and U.S. Pat. App. Pub. No. 2008/0175666, each of which are herein incorporated by reference.

Such operational limitations of placing concrete and other materials, and the corresponding limitation in construction throughput, affects the entire road building process because it slows down the material laying speed that can be attained for a project. This is highly undesirable because delays in the timeline of a project significantly increases overall material laying costs.

BRIEF SUMMARY

The present disclosure relates to a material placer and an augmented, high-volume hopper that have the capability work efficiently and seamlessly to provide a higher rate of concrete and other material placement with reduced downtime, relative to material placers known in the industry. This high volume hopper can also handle a wider variety of trucks.

In some embodiments, the present disclosure is directed to a material placer unit, configured to provide concrete or other materials to a location on a ground surface for further paving, the material placer unit having: a hopper, where the hopper includes: an auger; a passageway; and a gate having a sliding vibration plate, the sliding vibration plate being configured to extend and retract along the length of the gate, the sliding vibration plate also being configured to vibrate; a central module, having an access door that provides for access to interior machinery of the material placer unit; and a distribution conveyor, having an end housed within the central module, with a conveyor belt that receives concrete or other such materials via the hopper at a location within the central module.

In some aspects, the material placer unit has an end of the distribution arm within the central module which can be raised or lowered. In other aspects, the hopper further includes a buffer structure having a pressure-activated shock suppression system. In further aspects, the sliding vibration plate has an upper surface that includes a plurality of triangular projections.

In further aspects, the central module can have four jacking columns located at corners of the frame, configured to adjust the height of the frame. In some aspects, the material placer unit can include an access door that provides for access to interior machinery of the material placer unit. In other aspects, the distribution conveyor can have a range of motion, relative to the central module, of 170°. In further aspects, the actuation system is can be configured to vibrate the sliding plate. In some aspects, the transfer conveyor and the distribution conveyor are both configured to receive a material that is concrete or a concrete slurry. In other aspects, the central module further includes wheels and a motor mounted to the central module, and the material placer unit further includes a steering control system. In further aspects, the hopper, the transfer conveyor, and the distribution conveyor can provide an onboard volume capacity of about 8.75 cubic yards. In some aspects, the gate of the hopper is configured to elevate and press up against a bed or chassis of a truck. In some such aspects, the gate can further include a sealing lip configured to press up against the bed or chassis of the truck and prevent the spillage of material between the bed or chassis of the truck and the gate. In other aspects, a discharge end of the distribution conveyor is configurable to extend above and over barriers that are proximate or adjacent to the material placer unit.

In other embodiments, the present disclosure is directed to an augmented hopper, configured to receive concrete or other materials, having: an auger; a passageway; and a gate having a sliding vibration plate, the sliding vibration plate being configured to extend and retract along the length of the gate, the sliding vibration plate also being configured to vibrate. In some aspects, the hopper further includes a buffer structure having a pressure-activated shock suppression system. In other aspects, the sliding vibration plate has an upper surface that may include a plurality of triangular projections.

In further aspects of the augmented hopper, the actuation system is further configured to vibrate the sliding plate. In some aspects, the augmented hopper can further include vibrators mounted to the gate, vibrators mounted to the back gate, or both. In other aspects, the hopper can further include a buffer structure having a pressure-activated shock suppression system. In further aspects, the sliding plate can have an upper surface that includes a plurality of triangular projections. In some aspects, the auger can have flighting configured to move material within the trough toward the center of the auger. In other aspects, the auger can have paddles arranged to push the material within the trough toward the passageway. In some aspects, the augmented hopper can further have a mechanical coupling system configured to mount the augmented hopper to a mobile material distributor. In other aspects, the sliding plate can be beveled on a receiving edge of the sliding plate, a hopper edge of the sliding plate, or both.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 1C is a left side elevational view of the material placer and augmented hopper of FIG. 1A, in a first, operational configuration.

FIG. 1D is a left side elevational of the material placer and augmented hopper of FIG. 1A, in a second, elevated accessibility configuration, shown with the transfer conveyor, tail pulley end lowered to the ground.

FIG. 1E is a right side elevational view of the material placer and augmented hopper of FIG. 1A, in a first, operational configuration.

FIG. 1F is a right side elevational view of the material placer and augmented hopper of FIG. 1A, in a second, elevated accessibility configuration, shown with the transfer conveyor, tail pulley end lowered to the ground.

FIG. 1G is a right side elevational view of the material placer and augmented hopper of FIG. 1A in an operational configuration with a swing conveyor in an elevated position, according to aspects of the disclosure

FIGS. 8A and 8B are schematic illustrations of an augmented hopper receiving material from a truck, the truck having a pivot point at the back end of the truck bed, according to aspects of the present disclosure.

DETAILED DESCRIPTION

Figure 1A:
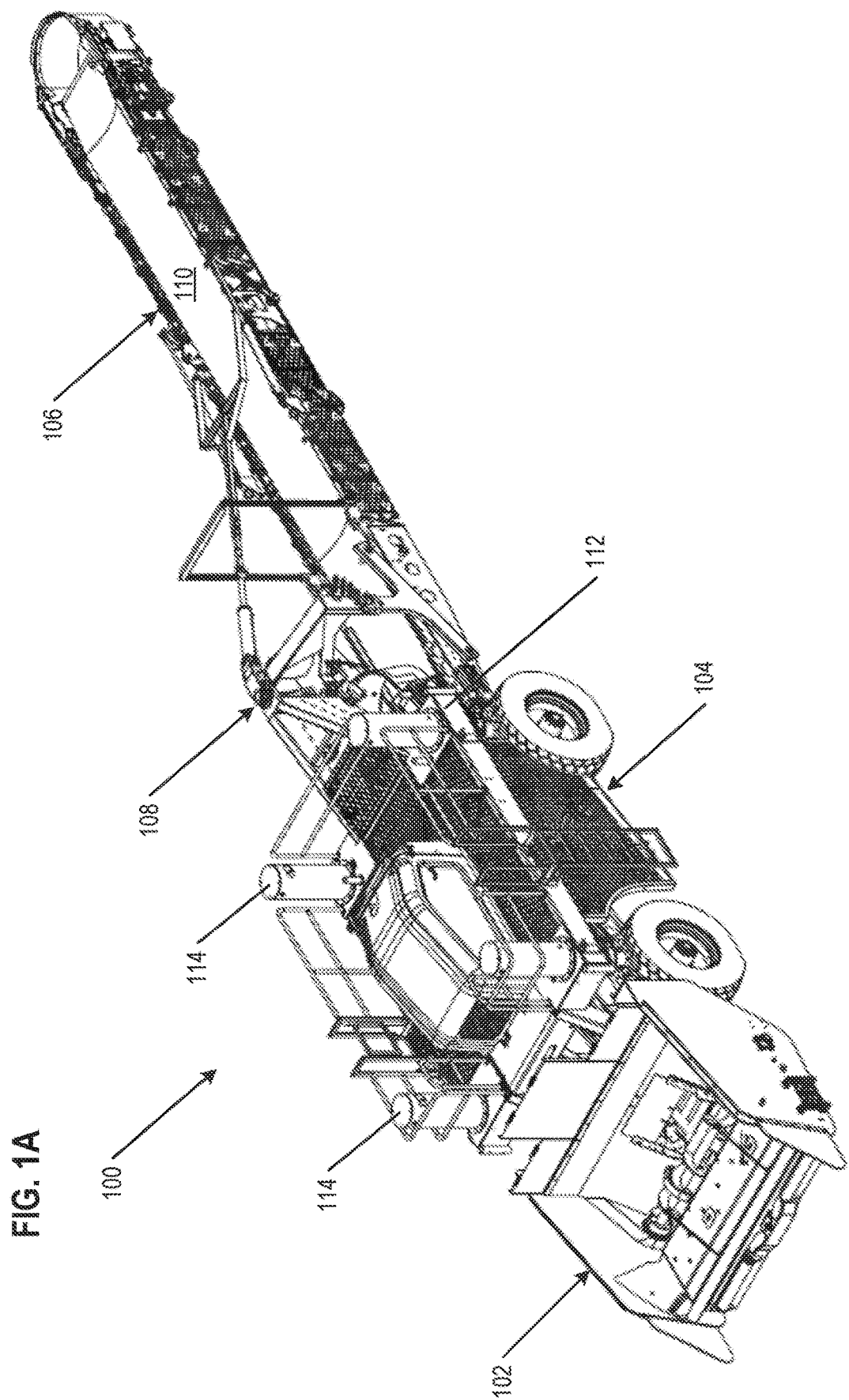
FIG. 1A is a perspective view illustration of a material placer and augmented hopper, according to aspects of the present disclosure.

The present disclosure is directed to a material placer, particularly a material placer that receives concrete or other material in an augmented hopper and then meters and delivers that concrete or other material to a location where the material will be transferred or paved. The material placer has an engineered structural accommodation that allow for advantageous access for ease of cleaning and maintenance of the transfer conveyor and hopper passageway, increasing the availability and reliability of the material placer, and thus reducing downtime and mechanical failure of the material placer. This accessibility allows for the capability to clean or remove any build-up of concrete (or other material) while the material placer is momentarily stopped during a work day. The augmented hopper improves the rate at which concrete or other material can be received by the material hopper, and thus the rate at which concrete or other material can be transferred, placed, and then paved. Each of these advantages, considered individually and in combination, provide for improved construction capabilities.

Many of the details, dimensions, angles and other features shown in the Figures are merely illustrative of particular embodiments. Accordingly, other embodiments can include other details, dimensions, angles and features without departing from the spirit or scope of the present invention. Various embodiments of the present technology can also include structures other than those shown in the Figures and are expressly not limited to the structures shown in the Figures. Moreover, the various elements and features shown in the Figures may not be drawn to scale. In the Figures, identical reference numbers identify identical or at least generally similar elements.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below, depending on the context of its use. The device may be otherwise oriented (rotated 90 degrees or at other orientations) and the spatially relative descriptors used herein are interpreted accordingly.

Although the terms "first", "second", etc. may be used herein to describe various elements, components, regions, layers and/or sections, it should be understood that they should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

As used herein, the terms "and/or" and "at least one of" include any and all combinations of one or more of the associated listed items.

As used herein, the term "about" is used to provide flexibility to a numerical range endpoint by providing that a given value may be within a functional range greater than or less than the given value. As used herein, unless otherwise specified, the given value modified by about is modified by 10%.

Improved Material Placer Access and Maintenance

Figure 1B:
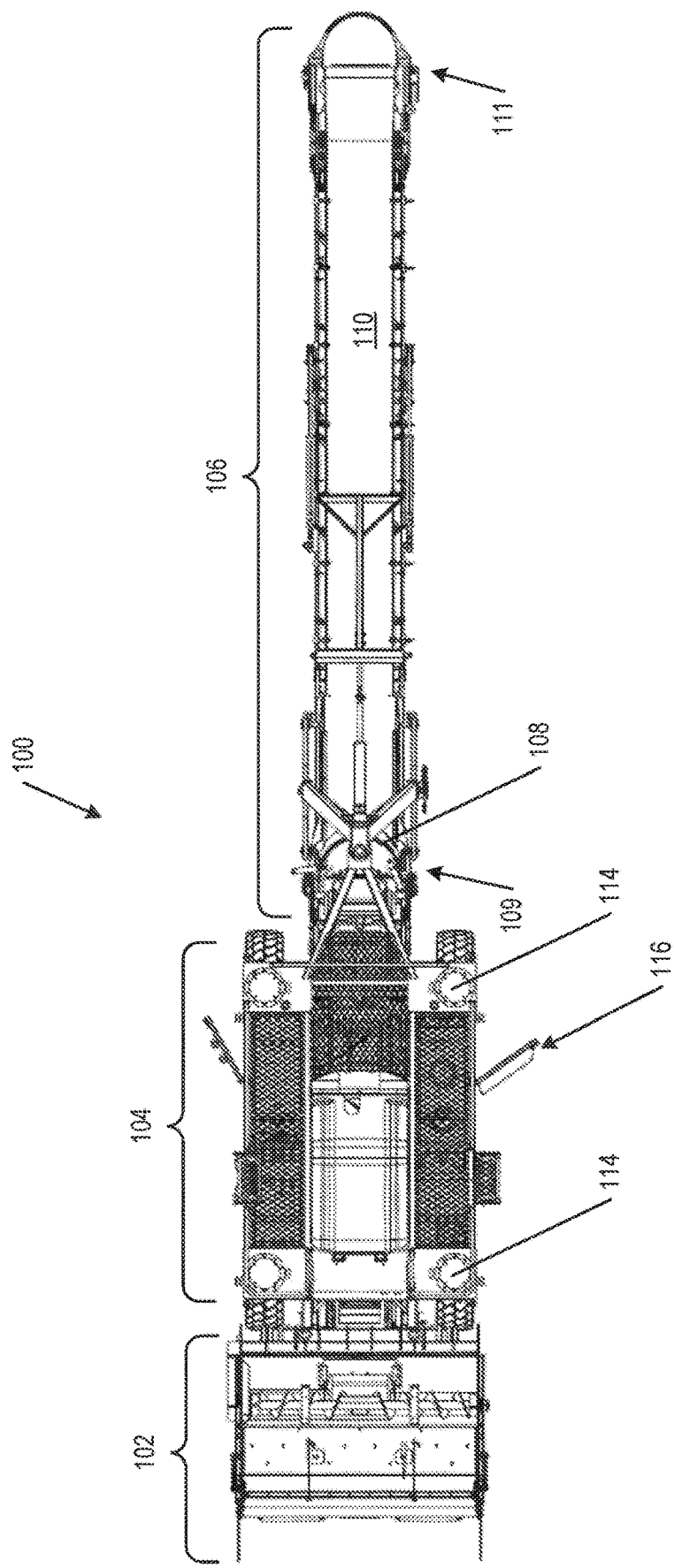
FIG. 1B is a top plan view of the material placer and augmented hopper of FIG. 1A.

FIG. 1A is a perspective view of a material placer 100 and augmented hopper 102. The augmented hopper 102 (alternatively referred to as a "high-volume" hopper) can be a detachable part or module of the material placer 100. FIG. 1B is a top plan view of the material placer 100 and augmented hopper 102. The material placer 100 has a center module 104, which houses the wheels, engine/motor(s), a transfer conveyor 118, and the various controls and electronics for the material placer 100. The material placer 100 further includes a distribution conveyor 106 (alternatively referred to as a "swing conveyor" or a "distribution arm"), mechanically connected to the center module 104 via a pivoting yoke 108 (alternatively referred to as a "swinging yoke" or a "hinged swing"), extending from the center module 104 outward, where a conveyor belt 110 extends along the full length of the distribution conveyor 106. The transfer conveyor 118 suspended within the center module 104 receives concrete or other material from the augmented hopper 102, the concrete or other material being driven by an auger through a passageway located at the rear of the augmented hopper 102. The distribution conveyor 106 has a receiving end 109 proximate to the center module 104, generally below the pivoting yoke 108, and configured to receive concrete or other material from the transfer conveyor 118 within a small hopper (not shown). The distribution conveyor 106 also as a discharge end 111, configured to place or unload material in a controlled manner as the material comes off of the conveyor belt 110.

The center module 104 is generally based around a frame 112 on which axles, wheels, crawler tracks, engines, siding, hopper, pivoting yoke, and the like can be mounted. In particular, optional jacking columns 114 can be located at the corners of the frame 112, secured to corresponding locations above or adjacent to each wheel of the material placer 100, allowing for the frame 112 to change height or elevation. In some implementations, the jacking columns 114 can be hydraulic-driven columns, such as telescoping columns. In other implementations, the jacking columns can be screw-drive, slew-drive, or stepper-motor enabled to adjust height. The front and rear wheels, or crawler tracks, can be steered and synchronized with a mechanical linkage. Such a mechanical linkage can tie the two front wheels or crawler tracks together, keeping them parallel relative to each other. Similarly, a mechanical linkage can tie the two rear wheels or crawler tracks to each other, keeping them relatively parallel, optionally by being pivoted via hydraulic cylinders. Each set of wheels and/or crawler tracks can be actuated or steered though use of a hydraulic cylinder coupled to the wheels and/or tracks. In another variation, the wheels and/or crawler tracks can be steered by slew drives connected to the wheels or and/crawlers, driven by hydraulic motors. In a further variation, the wheels and/or crawler tracks can be steered by a slew bearing, actuated by a hydraulic cylinder with a rotary position transducer. Each slew drive can be equipped with an angular position transducer allowing the two front wheels or crawler tracks and the two rear wheels or crawler tracks to be synchronized electronically (e.g. via an onboard control unit or processor). A motor mounted to the central module can drive the wheels, and a steering system operatively coupled to the motor and wheels (or crawler tracks) can allow an operator to drive the mobile material placer 100. The steering system can be physically mounted to the central module (e.g., a traditional steering column), a remote control (e.g., a handheld device that send electronic signals to a processor onboard the material placer 100 that controls the motor and wheels), or a combination thereof.

In some embodiments, the distribution conveyor 106 can be about thirty feet (30 ft.) long. In other embodiments, distribution conveyor 106 can be about thirty-five feet (35 ft.) long, or longer or shorter than thirty feet (30 ft.) as appropriate for a given material placer. The pivoting yoke 108 allows for the distribution conveyor 106 to be able to change its angle of material elevation (relative to the center module) from flat (0°) and parallel to the base of the center module, to raise up to a maximum angle (altitude) of about 20° to 25°. In some implementations, the maximum angle the distribution conveyor 106 can be elevated to is the largest angle the material on the distribution conveyor 106 can be elevated to without slipping on the conveyor belt 110. The assembly of the pivoting yoke 108 and distribution conveyor 106 to the frame 112 can also be modified so that the pivoting yoke 108 can have a hinged connection at the frame 112 near the material receiving end of the distribution conveyor 106, allowing the distribution conveyor 106 and pivoting yoke 108 to clear the top of an obstacle (e.g., a temporary barrier wall which are generally at least 36" high) while keeping the discharge end of the distribution conveyor 106 level with the ground.

The pivoting yoke 108 further allows for the distribution conveyor 106 to have a swing capability along an angle of azimuth (relative to the center module) across a range of about 170°, or more. To ensure that the transfer conveyor 118 always discharges material at the center of the receiving end 109 hopper of the distribution conveyor 106 no matter what angle the distributing conveyor 106 is oriented at, the vertical pivot axis of the center of a receiving end hopper of the distribution conveyor 106 is centered with the vertical axis of two pins, which is in turn centered on a vertical axis of the end of the transfer conveyor 118 off of which the concrete or other material is discharged. This reduces the amount of spillage when the distribution conveyor 106 is positioned at relatively extreme angles, which is a problem with other material placers known in the industry.

The components of the material placer 100 can also be arranged and moved into a transport configuration, generally reducing the profile and/or footprint of the material placer 100 such that driving the material placer 100 on the road, or loading the material placer 100 on a truck is easier and parts of the material placer 100 do not protrude out in a dangerous or inconvenient manner. In particular, the distribution conveyor 106 can include a hinge along its length, such that the distribution conveyor 106 can bend or fold up over the top of itself to reduce the transport configuration length of the material placer 100. As an alternative, the distribution conveyor 106 can be hinged under itself to reduce the transport configuration length. The adjustment of the distribution conveyor 106 length can be driven by hydraulic actuation.

The conveyor belt 110 of the distribution conveyor 106 can have an exemplary width of about thirty-six inches (36 in.), while in other embodiments the conveyor belt 110 can have a width of about twenty-four (24 in.) or about forty-eight (48 in.). The conveyor belt 110 can have a length commensurate with the length of the distribution conveyor 106 on which the conveyor belt 110 is mounted (i.e., long enough to wrap around the full length of the distribution conveyor 106, accounting for the top and bottom length of the distribution conveyor 106, the diameter of the tail and head pulley, and the height of the rollers of the distribution conveyor 106). The conveyor belt 110 can be made of materials such as rubber, heat resistant rubber, thermoplastics, metal, fabric, or leather. More specifically, the conveyor belt 110 can be made of materials including, but not limited to, polyester, polyvinyl chloride (PVC), silicone, polyethylene (PE), vulcanized rubber, stainless steel, carbon steel, canvas, cotton, urethane, neoprene, nylon, nitrile, or combinations thereof.

The material placer 100 can operate by moving in front of a road building machine, placing material in front of the machine while both are driven forward at about the same speed. In some aspects, the operations "working speed" of the material placer 100 can be from about zero to about one hundred ten feet per minute (0-110 fpm; about 0-33.5 meters per minute). In some aspects, the material placer 100 can be operationally coupled to a road building machine such that the two apparatuses steer and drive in a coordinated manner. In some implementations, a processor system including a microprocessor and operational controls are also mounted to the frame, allowing for operation and control (e.g., driving, reconfiguring, placing material, etc.) of the material placer 100 by an operator riding on the machine. In other implementations, the a processor system and operational controls can be wirelessly connected to control electronics of the material placer 100, allowing for operation and control of the material placer 100 by an operator standing or walking alongside the machine.

As seen in FIGS. 1A-G, the center module 104 of the material placer 100 includes an access door 116 in the siding of at least one side of the frame 112, and in some embodiments as shown, on both sides of the frame 112. From that access door 116, an operator (or laborer) can access the internal machinery (including the transfer conveyor and opening to the hopper) of the material placer 100 and can thus clean and maintain that internal machinery. If the material placer is equipped with optional jacking columns 114, the frame 112 can be put in a raised position, being elevated by the jacking columns 114. This increases the height available under the frame 112 which makes access and cleaning the internal machinery even easier. More specifically, FIG. 1C shows the left side of the material placer 100 and FIG. 1E shows the right side of the material placer 100 in a first, operational configuration. The vertical pivot axis 107 centered along the receiving end of the distribution conveyor 106 and the end of the transfer conveyor 118 is identified in FIGS. 1C and 1E. In the operational configuration, the material placer 100 has the access door 116 closed and the frame 112 is at a height appropriate for the material placer to be able to receive and distribute concrete or other material, and drive while working to place material. In contrast, FIG. 1D shows the left side of the material placer 100 and FIG. 1F shows the right side of the material placer 100 in a second, accessibility configuration. In the (raised) accessibility configuration, the material placer has the frame 112 raised to a height to allow even more room for an individual to open the access door 116, walk in, and have enough space to efficiently clean or perform maintenance on internal parts of the material placer 100. This allows an operator to clean parts of the transfer conveyor 118, which can include parts such as a conveyor belt, belt skirting, troughing and return rollers, and tail pulley, where concrete or other materials that harden tend to and cause mechanical failures.

Further shown in FIGS. 1C-1G is transfer conveyor 118, located primarily within center module 104 and aligned along the length of the material placer 100. Transfer conveyor 118 (alternatively referred to as a "transfer belt" or "discharge conveyor") receives concrete or other material delivered through the augmented hopper 102 on one end and moves that material forward onto the conveyor belt 110 of distribution arm 106. Transfer conveyor 118 can be made of the same materials as conveyor belt 110 as described above. Transfer conveyor 118 will have a length that is as long or longer than as the length of the center module 104, and a width that is about the same as, or narrower than, the width of conveyor belt 110. Is should be appreciated as seen in FIGS. 1D and 1F that the transfer conveyor 118 is relatively more accessible when the frame 112 is in a raised position made possible with optional jacking columns 114. Indeed, as shown in FIGS. 1D and 1F in an elevated accessibility configuration, the transfer conveyor and tail pulley end are lowered to the ground and thereby more accessible for cleaning or other maintenance. The relative change in height of the frame 112 and augmented hopper 102 in the accessibility configuration can be appreciated by the double-headed arrow shown in FIGS. 1D and 1F.

In some implementations, the system for raising and lowering portions of the center module, or the center module 104 itself, can include a set of two or a set of four jacking columns 114. In some aspects, such jacking columns can be operated to adjust the height of the center module 104 by about thirty-six inches (36 in.). The capability to adjust the height of the center module 104 (or portions thereof) by this amount both improves vertical access to the interior of the center module 104 and better facilitates being able to load the detachable augmented hopper 102 or other attachment onto a lowboy trailer (a trailer having two drops in deck height, alternatively referred to as a "low-bed" or "low-loader"). In some aspects, the jacking columns 114 can be configured to adjust the height of the center module (or portions thereof) across a range of height both above and below a (relative) ground level. In one example, jacking columns 114 can adjust the height of a center module 104 by about twenty-seven inches (27 in.) in total, between a height twenty-four inches (24 in.) above ground level and a height three inches (3 in.) below ground level. The two or more jacking columns can be operated individually or concurrently. In some implementations, all of the two or more jacking columns are raised and lowered to the same height for all configurations, while in other implementations, each jacking column of a pair of jacking columns can be raised to a height different than the other remaining jacking columns The ability to change and increase the ground clearance under the receiving end of the transfer conveyor and the distribution conveyor tail pulleys allows the material placer to load more easily onto a trailer for transport, to travel on uneven ground on a jobsite, and to climb up ramps or embankments without bottoming out or hitting the tail pulleys on the ground.

In some embodiments, the receiving end 109 of the distribution conveyor 106 proximate to the center module 104 can be connected to a vertical actuator (e.g. a hydraulic lift) that can raise or lower that discharge end 111 of the distribution conveyor 106, lowering as far as all the way to the ground. Such a vertical actuator can be separate or a part of the pivoting yoke 108. The additional vertical actuation of the receiving end 109 of the distribution conveyor 106 next to the center module 104 allows for more space for reaching parts for quick cleaning and/or maintenance.

In other embodiments, the location within the center module 104 where concrete or other material (received via a passageway) from the augmented hopper 102 is dumped onto the transfer conveyor 118 can be raised or lowered (again via a vertical actuator), allowing for further space and access to the internal machinery for cleaning and maintenance. Further, for changing or cleaning the transfer conveyor 118 belt, both the receiving tail end and the discharge end of the transfer conveyor 118 can be lowered to the ground.

The accessibility configuration is a meaningful improvement to material placers generally, as the typical route to reaching internal parts of a material placer for cleaning and maintenance (without partial disassembly or taking the machine out of service) is to have a worker (usually the smallest or skinniest person on the job site) crawl starting at the head pulley to insert themselves in that cramped space and attempt to reach all relevant parts from while being physically constrained. To the Applicant's knowledge, no prior material placer has implemented any such accessibility configuration.

Further shown in FIG. 1G is the material placer 100 in an operational configuration with the distribution conveyor 106 raised up at an elevated angle by the pivoting yoke 108. Positioning the distribution arm 106 at an elevated angle (e.g., 20°-25° relative the plane of the ground) while in an operational configuration allows for easier movement or transport of the material placer 100, avoiding obstacles and also preventing unintended spillage of concrete or other material off of the distribution conveyor 106 and conveyor belt 110.

Figure 1H:
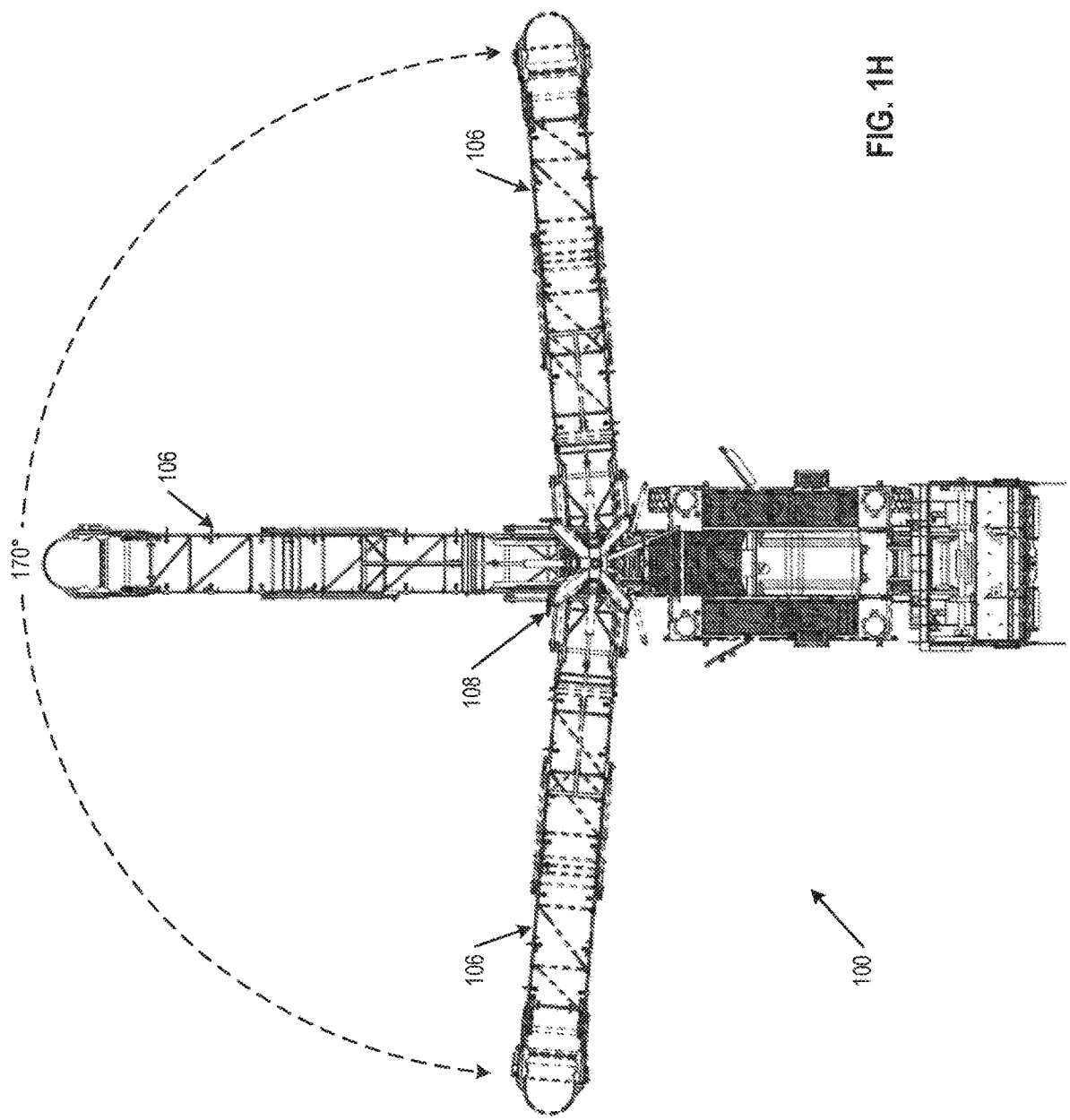
FIG. 1H is a top view of the material placer showing an exemplary range of motion of a swing conveyor, according to aspects of the disclosure.

Further shown in FIG. 1H is the material placer 100 with the distribution conveyor 106 illustrated in three positions, showing a 170° range of motion of the distribution conveyor 106, based around the pivoting yoke 108. The material placer 100 is capable of depositing concrete or other materials from the distribution conveyor 106 along the full range of motion of the distribution conveyor 106.

Augmented Hopper with Sliding Plate

Traditional hoppers used with material placers have an onboard volume capacity of 4.75 cubic yards (about 3.63 cubic meters), of which 3.5 to 4.0 cubic yards of that capacity is held on a conveyor belt, whereas most trucks depositing concrete or other material into the hopper have a volume hauling capacity of at least twice that (e.g. up to about 8 cubic yards). This difference in volume capacity leads to situations where a truck can only discharge at a rate in keeping with the ability of the hopper auger to remove material from the hopper (thereby making more room for material to discharge/slide out of the truck bed), the dumping truck pausing until the auger can remove more material, creating a time bottleneck for the overall process. This limitation of traditional hoppers is due to the truck dump bed discharging material directly on the hopper auger, resulting in very little or no excess holding capacity in the hopper.

Advantageously, the augmented hopper and conveyors of the present disclosure have an onboard volume capacity of approximately 8.75 cubic yards (about 6.69 cubic meters), allowing for one truck to unload almost its entire concrete or material load at once without overloading or overflowing the augmented hopper—this effectively doubles the rate at which the material placing process can proceed. With this augmented hopper, the primary limitation to the speed of the discharge process will likely be how quickly a truck can lift its dump bed. The ability of the augmented hopper to improve the material placing process does depend, in part, on the ability of the discharge delivery truck dump bed to unload the material proximate to the auger with the higher volume hopper. Depending on where the dump bed hinge connection is on a given dump truck chassis, the location of where material slides out of the truck can change. It is not uncommon for many of the trucks hauling concrete (or other materials) on a jobsite to be different. Moreover, not all truck beds are equipped with vibration means that can facilitate discharge. With some types of delivery trucks, the rear lip of the dump bed is relatively too far away from the auger located at the back of the hopper, resulting in a dead spot where the material between the rear lip of the truck dump bed and the front edge of the auger blocks the flow of the remaining few cubic yards of material discharging out of the truck dump bed. In such situations, when the dump bed is nearly empty of material, the discharged material has insufficient head height (or moment M) to push the dead spot in the hopper closer to the auger. In some further cases, even vibration applied to the hopper can be insufficient to efficiently move the discharged material toward the auger. This larger-volume augmented hopper includes further innovations to ensure that the complete load of concrete or other material is transferred from the end of the dump truck bed to the auger in the augmented hopper.

It should also be noted that in working with most types of dump trucks, the adjustable pivoting gate and sealing lip (sometimes referred to as "flop gate") of the augmented hopper, are designed to seal up against the body of the dump truck bed during discharge. As the truck dump bed is raised and the truck bed apron moves lower, the hydraulic cylinders that raise and lower the pivoting gate, are designed to relieve so the pivoting gate linkage is not damaged. Once the truck empties its load and pulls away from the augmented hopper, the adjustable pivoting gate can be raised up to it full angle (approx. 60°) by hydraulic actuator (as illustrated in FIG. 4C) and with the aid of vibrators mounted to the bottom of the flop gate, the residual concrete or other material on the flop gate can be fully discharged into the auger. The back wall of the hopper, which has a relatively steep angle thereby feeding received material directly into the auger trough, can also optionally include vibrators mechanically coupled to the back wall to help facilitate complete emptying of the hopper.

Figure 2A:
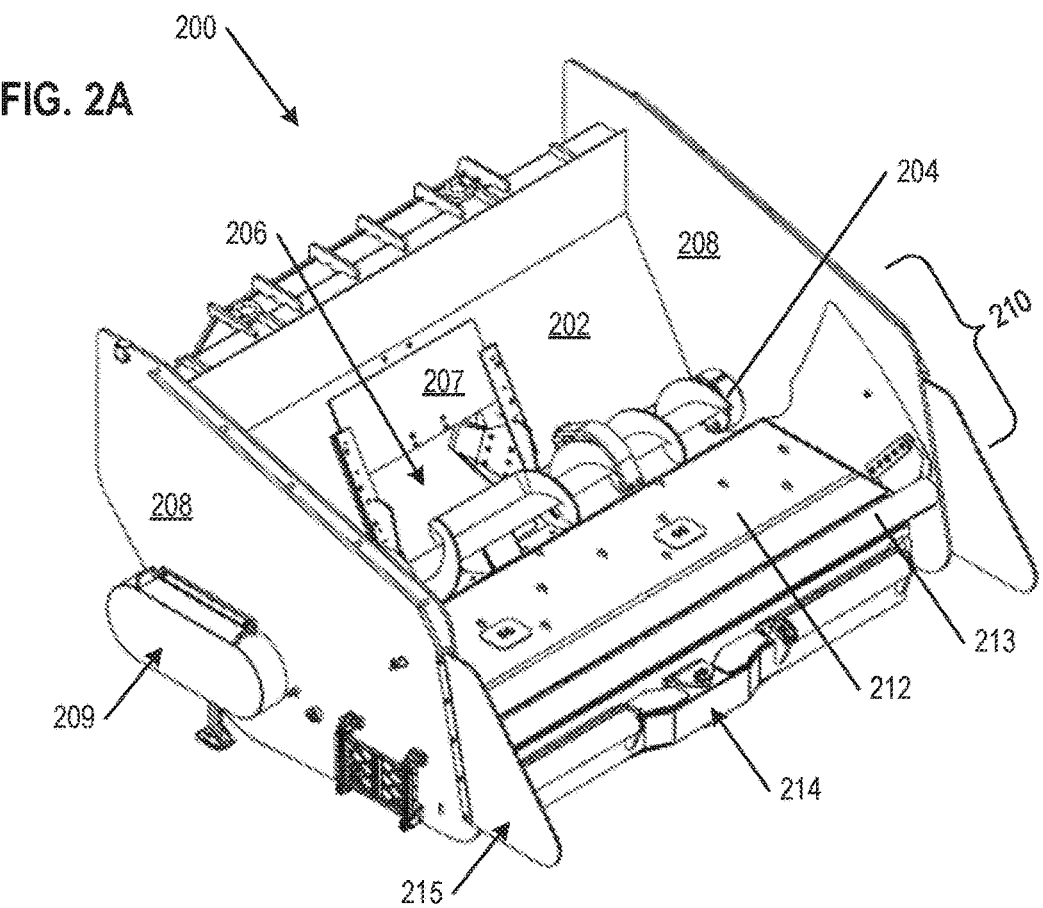
FIG. 2A is a perspective view illustration of an augmented hopper (as shown in FIGS. 1A-H), shown in isolation, further illustrating an adjustable pivoting gate and a sealing lip in a first, extended configuration, according to aspects of the present disclosure.
Figure 2B:
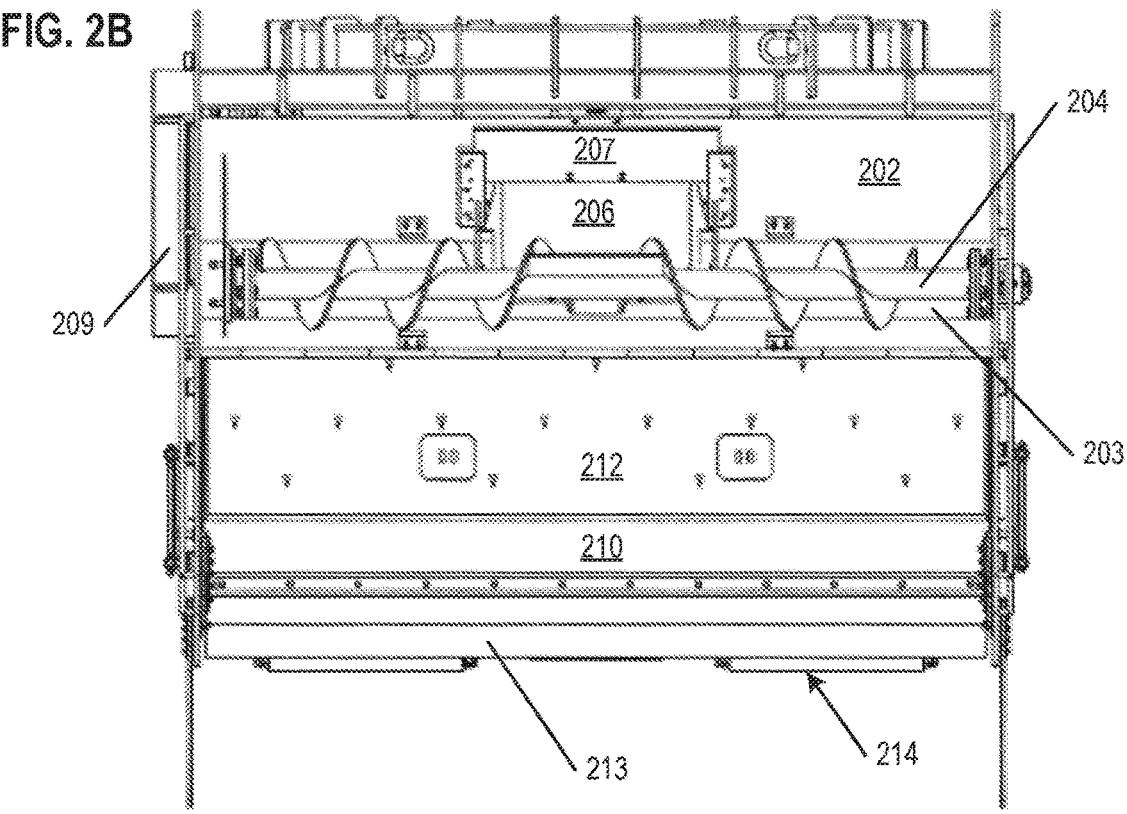
FIG. 2B is a top plan view of the augmented hopper in the first, extended configuration.

FIG. 2A shows a perspective view of the augmented hopper 200 (element 102 in FIGS. 1A-1F) in a first configuration where a sliding plate 212 is extended. FIG. 2B shows a top plan view of the augmented hopper 200 in the configuration with the extended sliding plate 212. The sliding plate is mounted on a gate 210, the gate 210 being constructed to pivot and raise up an outer edge when receiving concrete or other material into the augmented hopper 200. FIGS. 2A and 2B further illustrate the auger 204 and the a passageway 206 with an adjustable shut-off gate 207 arranged to open or close off the passageway 206. The augmented hopper 200 has a receiving back wall 202, two side walls 208, and a base floor 203 which in combination form and define the space in which concrete or other material is received, or in other words, the trough (or "auger trough") of the hopper. The receiving back wall 202 has the passageway 206 (alternatively referred to as a "hole" or "outlet") within the back wall 202 surface that is located to receive material as guided and delivered by the auger 204. The auger 204 and the base floor 203 are in part mounted to the side walls 208 and back wall 202, where the auger 204 rotates and thereby directs material within the trough of the augmented hopper 200 toward the passageway 206. In some aspects, the back wall 202 can also include a shut-off gate 207 structure that can closes down the passageway 206 in order to control the amount of material that can flow through onto transfer belt (on the other side of the back wall 202). The shut-off gate 207 can control of the flow of material, particularly relatively wetter materials such as high slump concrete (which flows like water), to prevent the flooding of the transfer belt with material. The shut-off gate 207 can be a hydraulically actuated vertical gate, which can be controlled and adjusted electronically and/or manually.

The gate 210 (e.g., a flop gate) is an adjustable pivoting gate having a sliding plate 212 also provides for a space where a volume of concrete or other material can be held within the augmented hopper 200 as the material is passed through to the transfer conveyor. As shown, the sliding plate is 212 mounted onto the gate 210 and is arranged to reversibly move back and forth relative to the receiving end of the augmented hopper 200. In combination with the trough formed by the side walls 208 and back wall 202, along with the holding capacity of the transfer conveyor 118 and the distribution conveyor 106, the augmented hopper 200 is capable of holding a material volume of approximately 8.75 cubic yards. Optionally, spill walls 215 can extend from the side walls 208 outward on the receiving end of the augmented hopper, functioning to prevent spillage of concrete or other materials onto the ground when being dumped into the augmented hopper 200.

The augmented hopper 200, including the auger drive (motor) and support bearings on the outside of the side walls 208 are configured to have a width that conforms to the general form of the material placer to which the augmented hopper 200 is attached. In some aspects, the width of the augmented hopper 200 is no greater than 11 feet 4 inches (3.45 meters). Similarly, the interior dimensions of the receiving space of the augmented hopper (e.g., the distance between the interior surfaces of the two side walls 208) are wide enough to accommodate a large off-road truck or semi-end dump truck trailers. Further, the receiving region and lip of the augmented hopper 200 are configured to be low enough (relative to the ground) to accommodate the large off-road truck and semi-end dump truck trailers. These capabilities were not possible with traditional hoppers known in the industry.

The auger 204 located at the back of the augmented hopper 200 is designed to work with the steep back wall 202 to empty the hopper contents through the passageway 206, taking advantage of gravity. The contents of the hopper feed an auger 204 which runs in the trough. In some aspects, the auger 204 can have a diameter (including the flighting and the shaft of the auger) of about fourteen inches (14"). The auger 204 can be driven by a hydraulic motor 209 (as shown, encased within a housing on the outer surface of the augmented hopper 200) driven at variable speeds and with sufficient torque so that the speed at which the auger 204 is rotated can be optimized and transfer any type of material at high production rates. In some implementations, the auger 204 is driven by the hydraulic motor 209 on one side where it is coupled to the augmented hopper 200, and the auger 204 spans the entire width of the hopper between the two side walls 208. Where the auger 204 connects with the hydraulic motor 209 on one side wall 208, and on the opposing side wall 208 of the augmented hopper 200, there are separate bearings with housings for the bearings that are constructed to be narrow enough, and with steep angles, so that concrete or other material handled in the augmented hopper 200 does not aggregate or bridge in this area. This allows contents in the augmented hopper 200 to clean out easily after each load so there is no material build-up, which is undesirable. The auger 204 has both right-hand and left-hand flighting so that the contents in the hopper are directed and carried by the auger 204 to the center of the augmented hopper 200. At the center of the auger 204 in the augmented hopper 200, the receiving tail end of the transfer conveyor 118 collects the concrete or other material from the augmented hopper 200 via the passageway 206. The center portion of the auger 204 can be designed with opposing paddles, positioned to be at 180 degrees relative of each other on the circumference of the auger 204. These paddles can be arranged to push the contents away from the auger 204 through the passageway 206 on to the transfer conveyor 118. The auger 204 can be configured to have different types of flighting to reduce wear rates. Further, the auger 204 is configured to bolt in and out of the augmented hopper 200 in one piece. In some aspects, the trough below the auger 204, as well as portions of the auger 204 itself, can be lined with wear-resistant steel.

The adjustable pivoting gate 210 of the augmented hopper 200 has a receiving edge that is lower (closer to the ground) than prior hoppers known in the industry. Moreover, the receiving edge of the gate 210 includes a sealing lip 213 which, when the gate 210 is raised up to meet a vehicle unloading material into the augmented hopper 200, acts to seal the gap between the gate 210 and the vehicle, preventing spillage of material onto the ground during the transfer process. The sealing lip 213 can be a material (e.g., rubbers, plastics, silicones, leathers, etc.) that is secured (e.g., bolted, adhered, screwed, etc.) to the receiving edge of the gate 210 and forming a compressible structure such as a loop.

Accordingly, the sealing lip 213 can also function as a physical shock absorber when the a portion of a vehicle (e.g., the bed of a truck) impacts onto the gate 210 at the start of an unloading process. This configuration and structure allows the augmented hopper 200 to successfully operate with a greater variety of trucks (e.g., dump trucks or semi-end dump trucks where the truck bed is at a steep discharge angle when unloading), particularly where the back of the dump bed is very low to the ground. The rotation of the auger 204 moves concrete or other material received in the augmented hopper 200 through the passageway 206, which leads to the central module 104 and distribution conveyor 106 and conveyor belt 110. As noted above, the gate 210 of augmented hopper 200 can pivot upward from a generally flat or horizontal orientation and seal up against the dump bed of a delivery truck as concrete or other material slides down into the receiving space of the hopper. The augmented hopper is large enough so that if the entire contents of the truck bed empties at once, the augmented hopper will not be overloaded. Here, the gate 210 includes a sliding plate 212, in an extended configuration positioned toward the inner edge of the gate 210, which is described in more detail below.

Further, a bumper structure 214 is included on the lower portion of the augmented hopper, providing for a protective buffer or cushion, that reduces the damage or hard impacts between the augmented hopper 200 and any truck backing up next to the augmented hopper 200. This structure saves cycle time as well because time is not lost with the truck driver and the dump man trying to back the truck in relatively slowly trying to avoid hard impacts with the hopper. To achieve this in some embodiments, the bumper structure 214 can have active pushback features, such as a pressure-activated shock suppression system, employing hydraulically telescoping push rollers that push against truck tires, or a push plate that pushes against the truck chassis between its rear wheels. FIGS. 2A and 2B shows the bumper structure 214 in a retracted position while FIGS. 3A and 3B show the bumper structure 214 in an extended position.

Figure 3A:
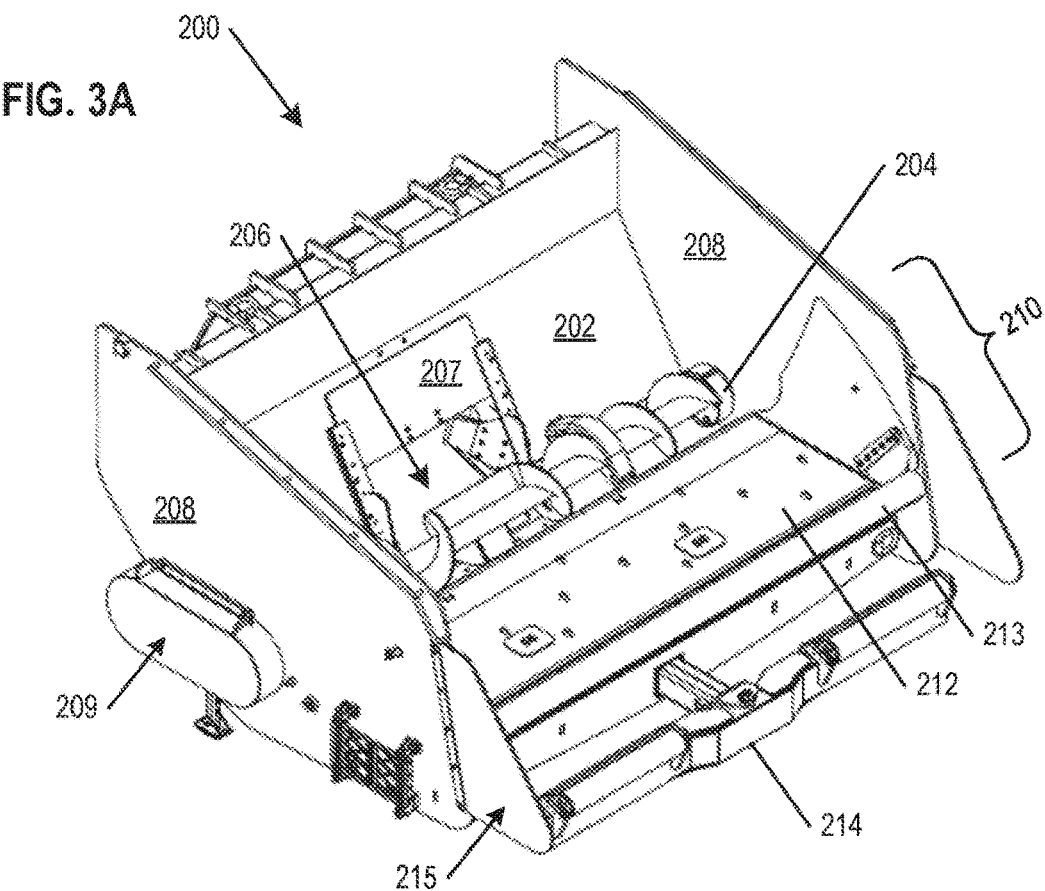
FIG. 3A is a perspective view illustration of the augmented hopper of FIG. 2A illustrating the adjustable pivoting gate and a sealing lip in a second, retracted configuration, according to aspects of the present disclosure.
Figure 3B:
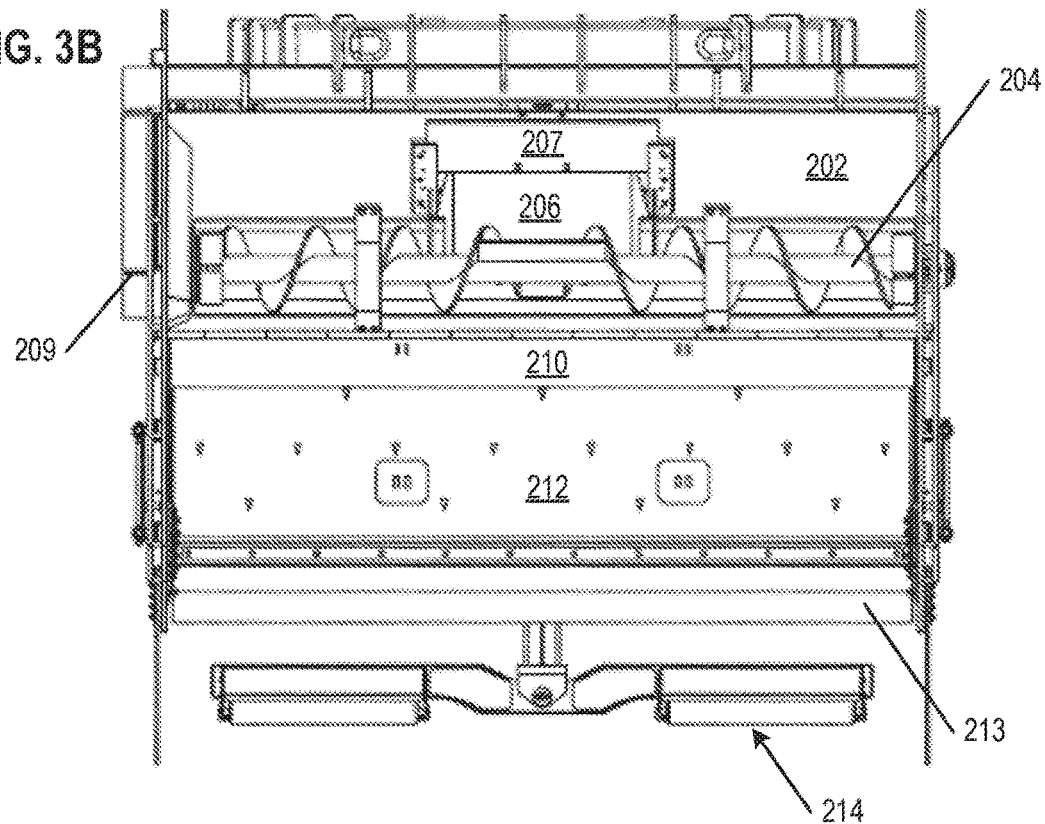
FIG. 3B is a top plan view of the augmented hopper in the second, retracted configuration.

FIG. 3A shows a perspective view of the augmented hopper 200 in a second, retracted configuration. FIG. 3B shows a top plan view of the augmented hopper 200 in the second, retracted configuration. In FIGS. 3A and 3B, the bumper structure 214 is extended outward (i.e., in the direction that would abut and buffer against a truck backing up to unload into the augmented hopper 200). More precisely, the sliding plate 212 in the retracted configuration is positioned toward the outward edge of the gate 210.

Figure 4A:
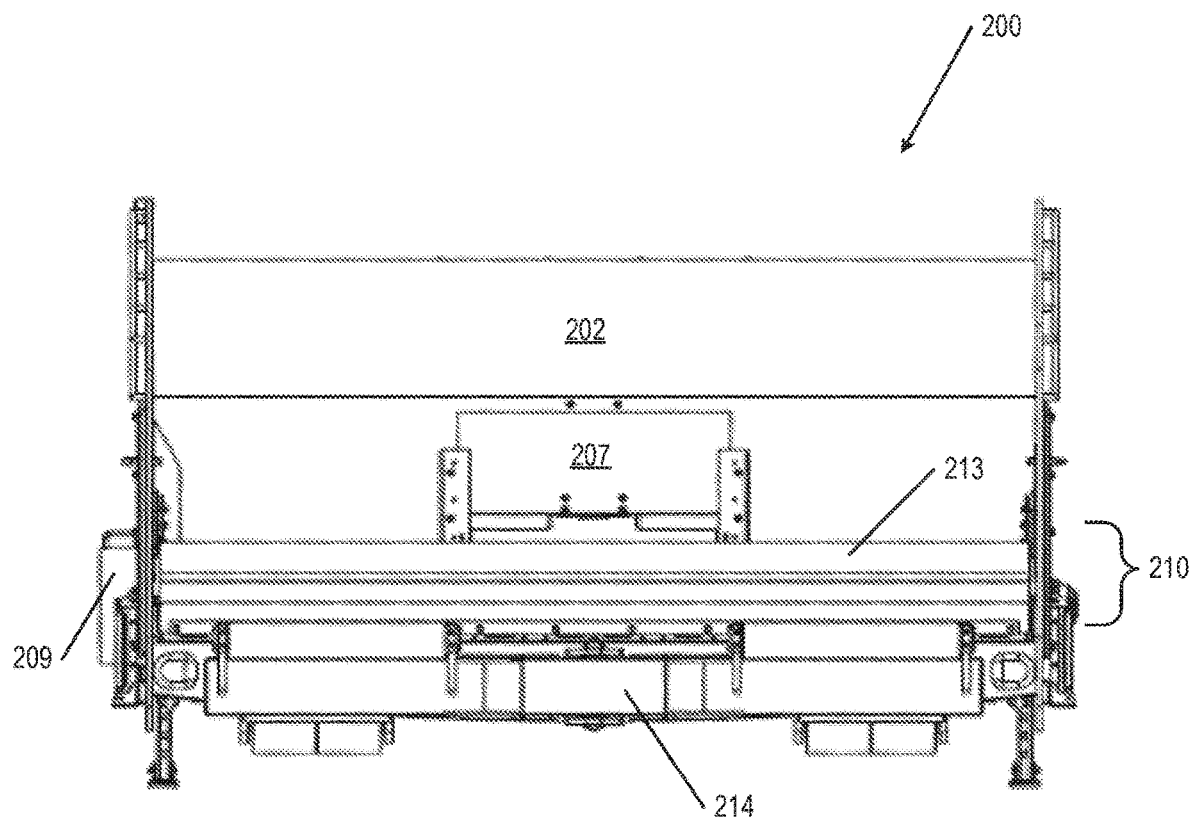
FIG. 4A is a front, elevational view illustration of the augmented hopper of FIG. 2A, according to aspects of the present disclosure.
Figure 4B:
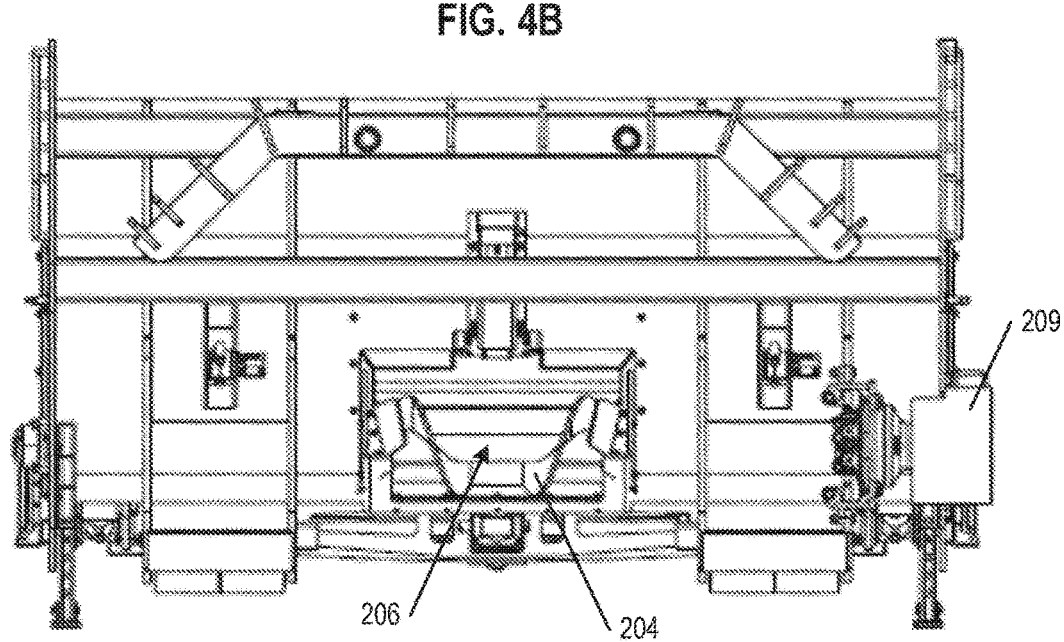
FIG. 4B is a rear, elevational view illustration of the augmented hopper, according to aspects of the present disclosure.
Figure 4C:
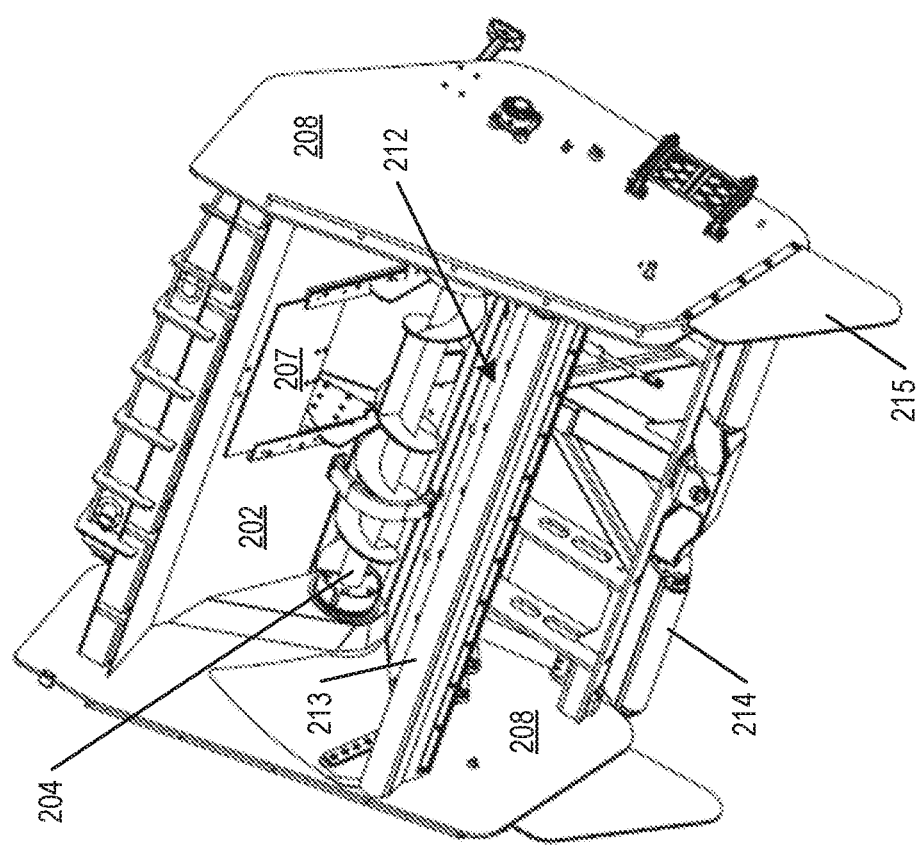
FIG. 4C is a perspective view of the augmented hopper in a illustrating the adjustable pivoting gate and sealing lip in an elevated configuration, according to aspects of the present disclosure.

FIG. 4A shows a front elevational view of the augmented hopper 200 and FIG. 4B shows a rear elevational view thereof. FIG. 4A provides for a further understanding of the relation and size of the gate 210, sealing lip 213, bumper structure 214, back wall 202, and shutter door 207 over the passageway 206. FIG. 4B provides for a further understanding of the side and relation of the auger 204 and passageway 206 through which concrete or other material is directed and passed through from the auger 204 trough into the space of the center module, and onto the tail or receiving end of the transfer conveyor 116.

FIG. 4C is a top view of the augmented hopper 200 illustrating the adjustable pivoting gate 210 and sealing lip 213 pivoted to a folded-up position (with the gate 210 at about 60°) which provides for a further understanding of the relation of the with sliding plate 212, auger 204, and the trough of the augmented hopper 200. The folded-up configuration of the augmented hopper 200 can be used for minimizing the size or footprint of the augmented hopper 200 for transportation.

When a truck backs-up to the augmented hopper 200, and in some implementations engaged with a roller bumper structure 214, the gate 210 with sealing lip 213 can raise and extend upward, sealing the path to allow for all of the concrete or other material to pass over the gate 210 and into the augmented hopper 200 in the direction of the auger 204. Within the augmented hopper 200, the auger 204 moves the concrete or other material to the center of the hopper and then through the passageway 206. In some applications, perhaps depending on the truck, the gate 210 can rest on the chassis of the truck to seal the path (in which case the gate may not include a sealing lip 213). In other aspects, the gate 210 with a sealing lip 213 can be pressed up against the underside of the dump truck bed to seal the path. Accordingly, in some implementations, the gate 210 can form a sealed path with a respective truck by extending upward by 5°, 10°, 15°, 20°, 25°, 30°, 35°, 40°, 45°, 50°, 55°, or at any increment or gradient from 0° to 60°.

Figure 5A:
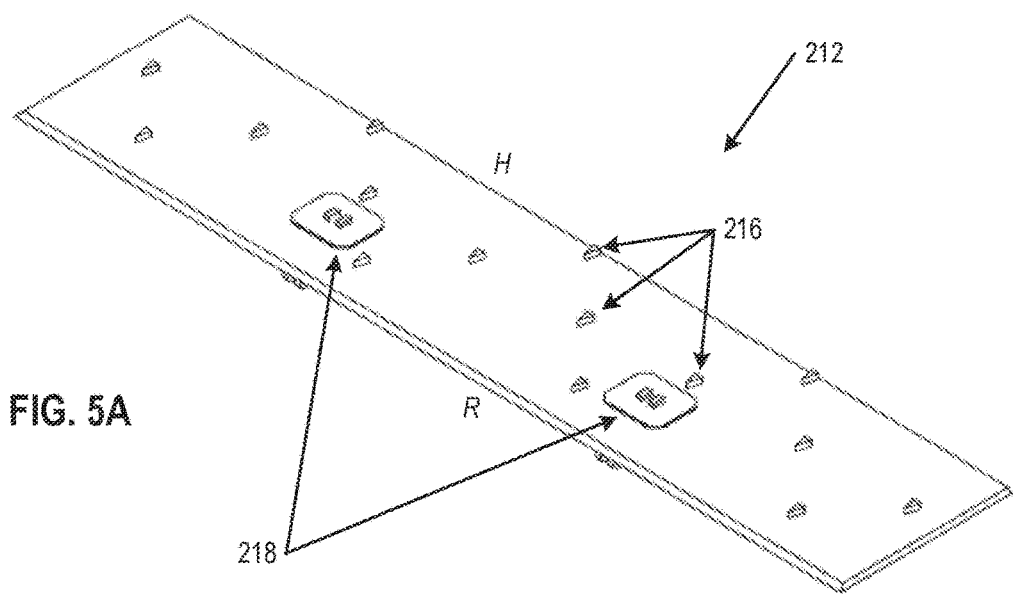
FIG. 5A is a perspective view illustration of a sliding plate of the augmented hopper, according to aspects of the present disclosure.
Figure 5B:
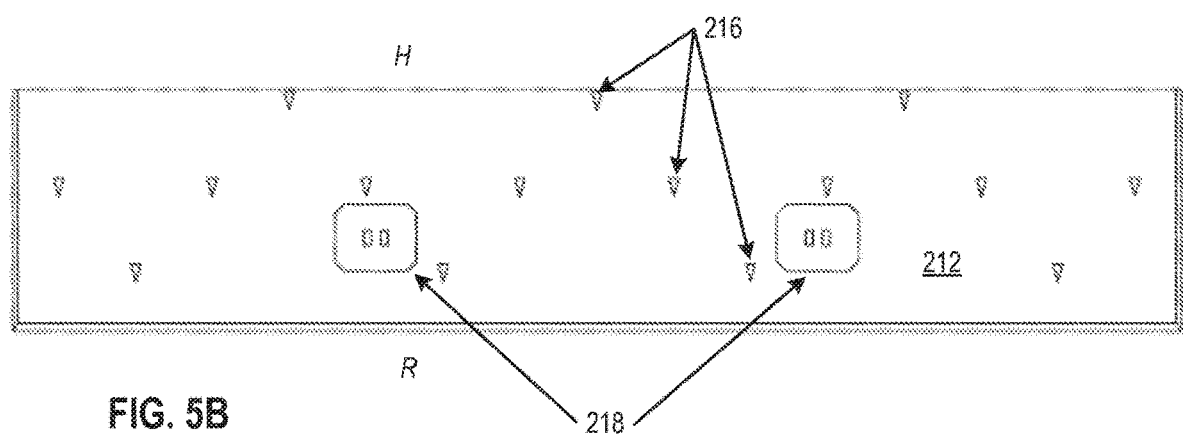
FIG. 5B is a top plan view of the sliding plate of the augmented hopper.
Figure 5C:
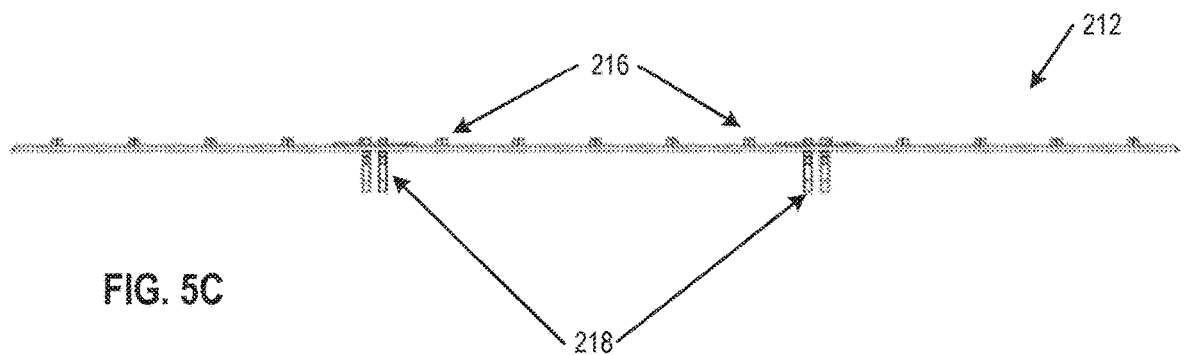
FIG. 5C is a front edge view of the sliding plate of the augmented hopper.

FIGS. 5A-5C further illustrate details of the sliding plate 212, which is configured to be mounted on the adjustable pivoting gate of the augmented hopper. FIG. 5A is a perspective, FIG. 5B is a top plan view, and FIG. 5C is a front edge view of the sliding plate 212 (viewed here as a separate element from the augmented hopper 200 and gate 210), which is further identified as having a receiving edge R (the outward, truck facing side of the plate) and a hopper edge H (the inward, hopper facing side of the plate). The sliding plate 212 can include triangular projections 216 (alternatively referred to as "nubs") arranged to point in the direction of the receiving edge R of the sliding plate 212. Accordingly, when the sliding plate 212 is retracted, moving out and pushing into or under concrete or other material that has discharged out of the truck, the triangular projections 216 offer little resistance and can cut or wedge through the concrete due to the angle/point of the triangles. Conversely, when the sliding plate 212 is extended, moving back toward the auger trough of the augmented hopper 200, both the frictional resistance between the concrete or other material and the sliding plate as well as the bases of the triangular projections 216 can pull the concrete or other material downward in the desired direction back toward the auger trough of the augmented hopper 200. The sliding plate 212 can move back to the retracted position in a subsequent cycle.

The sliding plate 212 is a part of the overall gate 210, covering a part of the upper surface of the gate 210. The sliding plate 212 can be reciprocally moved between positions biased toward the hopper edge H of the gate 210 (i.e., the back edge proximate to the auger trough and back wall 202) and the (front) receiving end R of the gate 210. The sliding plate 212 can be beveled on the receiving edge R, and on the hopper edge H, where the beveling can extend along effectively the complete width of the gate 210. When the gate 210 is receiving a load of concrete or other material, the sliding plate 212 will be directly underneath the discharged material passing over the gate 210. Any concrete or other material that does not drop into the augmented hopper 200 due to gravity (e.g., because the moment of the concrete reaches a natural angle of repose sitting on the gate 210, which is expected for a low slump material like concrete or granular base material) will tend to be resting on the sliding plate 212. The sliding plate 212 is further shaped and configured to cut through or wedge underneath the concrete or other material that has discharged out of the truck dump bed. Accordingly, the sliding plate 212 can be retracted to be further underneath the concrete or other material remaining in the truck. The sliding plate 212 can then be extended in the direction of the auger trough of the augmented hopper 200, thus pulling the concrete or other material downward out of the bed into the augmented hopper 200 (moving the moment of the concrete to be over the trough and not over the gate 210 surface). This additional material discharge from the truck dump bed is available, in part, because following the previous retraction of the sliding plate 212, the prior portion of concrete or other material has been move and discharged toward the auger 204.

A few cycles of the reciprocating or shuttling motion of the sliding plate 212 can be sufficient to push most remaining material between the truck dump bed and the auger trough into the path of the auger 204, making room on the gate 210 for more material to discharge out of the truck dump bed and into the augmented hopper. There can be further need to get all of the concrete or other material out of a truck, and thus the sliding plate 212 can be vibrated to shake concrete or other such material down the gate 210 and off of the gate 210 into the main space of the augmented hopper 200. In such embodiments, the sliding plate 212 is coupled with vibrators mounted to the underside of the gate 210. The vibrators can be independent modules, operatively coupled with the control system of the augmented hopper 200, configured to cause vibration (e.g., with a gyroscopic internal device) on command.

The sliding plate 212 can be movably connected to the gate 210 through one or more post structures 218 that are secured to (e.g., welded) and extend downward from the bottom surface of the sliding plate 212. The post structures 218 pass through slots cut in the flop gate 210, where the post structures 218 can be mechanically coupled with an actuator system configured to reciprocally move the post structures 218 (and thereby sliding the sliding plate 212) along the length of the gate 210. In some aspects, the post structures can be secured to the actuator system with hairpin cotter pins, with cylindrical pins, or other fastening hardware. In operation with the gate 210 extended outward for use, the post structures 218 secured to the actuating system, while with the gate 210 folded inward the post structures 218 can be detached (e.g., unpinned) from the actuator system. While detached from the actuating system, the underside of the sliding plate 212 can be tilted away from the top surface of the gate 210 can, and the two surfaces can be cleaned or repaired.

It should be appreciated that the triangular projections 216 on the sliding plate 212 as shown in FIGS. 2A-2B, 3A-3B, and 5A-5C can be arranged on the surface of the sliding plate in a number of configurations. In some implementations, projections can be arranged biased toward the receiving edge R, biased toward the hopper edge H, or arranged toward the center of the sliding plate between the receiving edge R and the hopper edge H. The density of projections on the surface of the sliding plate can vary depending on the region of the sliding plate, for example, there can be a greater density of projections in the middle of the sliding plate as compared to the receiving edge R and the hopper edge H, or vice versa. In other implementations, projections can be located only proximate to the receiving edge R, only proximate to the hopper edge H, or only in the center of the sliding plate (between the receiving edge R and the hopper edge H). It can be further appreciated that the projections located on a sliding plate can have a variety of shapes other than triangular, (e.g. rectangular, square, crescent, star, convex, concave, etc.). Further, the type of projections on a sliding plate can include a mixture of different shapes, arranged equally across the surface or the plate, or arranged with certain shaped projections on specific regions of the plate surface, as appropriate for a given application or material to be received.

Figure 6A:
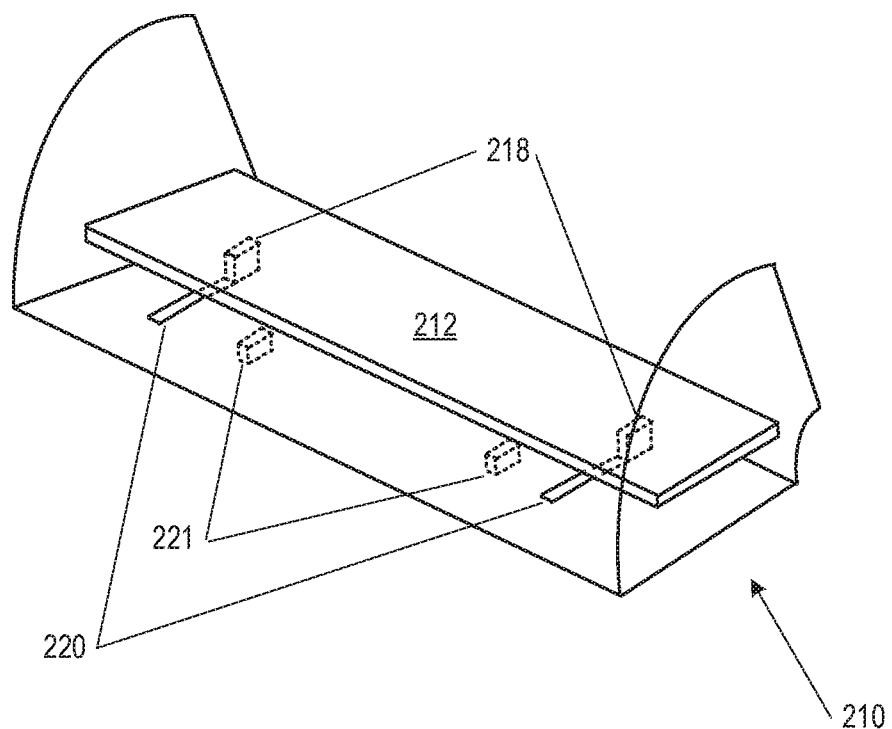
FIG. 6A is a schematic illustration of the sliding plate mounted on the adjustable pivoting gate for an augmented hopper, according to aspects of the present disclosure.
Figure 6B:
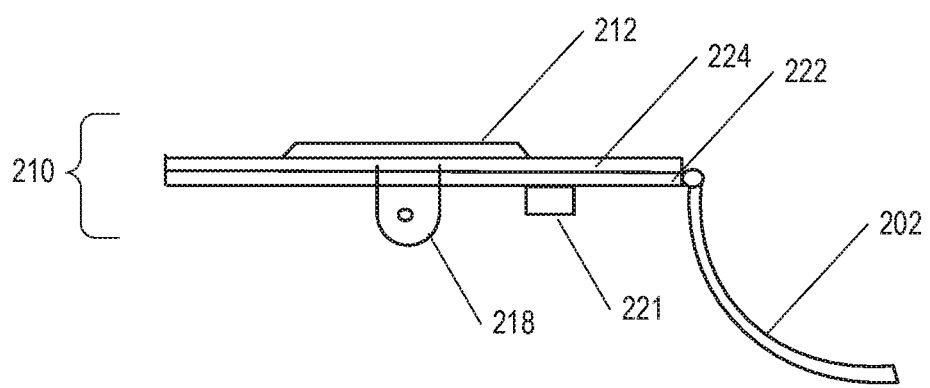
FIG. 6B is a schematic profile illustration of the sliding plate mounted on the adjustable pivoting gate for an augmented hopper, according to aspects of the present disclosure.

FIGS. 6A and 6B further illustrate the gate 210 and a sliding plate 212 of the augmented hopper 200. In particular, post structures 218 are shown in relation to slot cuts 220, through which the post structures 218 pass through. The post structures 218, when coupled to an actuator system, can be reciprocally moved along the length of the slot cuts 220, thereby moving the sliding vibration plate 212. The sliding plate 212 can also be vibrated by the actuator system (e.g., by quickly moving the post structures 218 a short distance back and forth), providing a dual functionality to the sliding plate 212. Alternatively, independent vibrators 221 can be present for applying vibration to the sliding plate 212, and are also shown coupled to the underside of the gate 210 The sliding plate post structures 218 and the slots cut in the gate 220 are designed in such a way that the slots in the gate 220 are always covered by the sliding plate 212, such that concrete or other material cannot fall into or leak through the slots.

FIG. 6B further details the structure of the gate 210. The base gate layer 222 of the gate 210 can be pivotally coupled to the leading edge of the auger trough, the back of which is welded to the back wall 202 of the augmented hopper 200, and can be formed of steel, other metal alloys, or combination thereof. Above the base gate layer 222 a low-friction layer 224 may be included, which completely covers the surface area of the base gate layer 222. The low-friction layer 224 is sufficiently slippery and non-stick in character such that a bolus of concrete or other material will generally not stop moving along the surface of the low-friction layer 224 due to friction alone. The low-friction layer 224 can be adhered or otherwise secured to the base gate layer 222 such that concrete or other material does not get in between these two layers. The low-friction layer 224 can be formed of plastics including, but not limited to, ultra-high-molecular-weight polyethylene (UHMW-PE), high density polyethylene (HDPE), polytetrafluoroethylene (PTFE), and the like. The sliding plate 212 is the top layer of the gate 210, positioned above the low-friction layer 224, covering the slot cuts 220 so that concrete or other discharged material does not fall into or harden with in the slot cuts 220. The sliding plate 212, however, does not completely cover the surface area of the low-friction layer 222. Rather, the sliding plate 212 can have a width effectively equal to the width of the low-friction layer 222 but have a shorter length, such that whichever position the sliding plate 212 is at, the plate remains above the surface of the low-friction layer 222 without hanging over the edge of the gate 210. Like the base gate layer 222, the sliding plate 212 can also be a steel plate, or formed of another metal alloy.

Figure 7A:
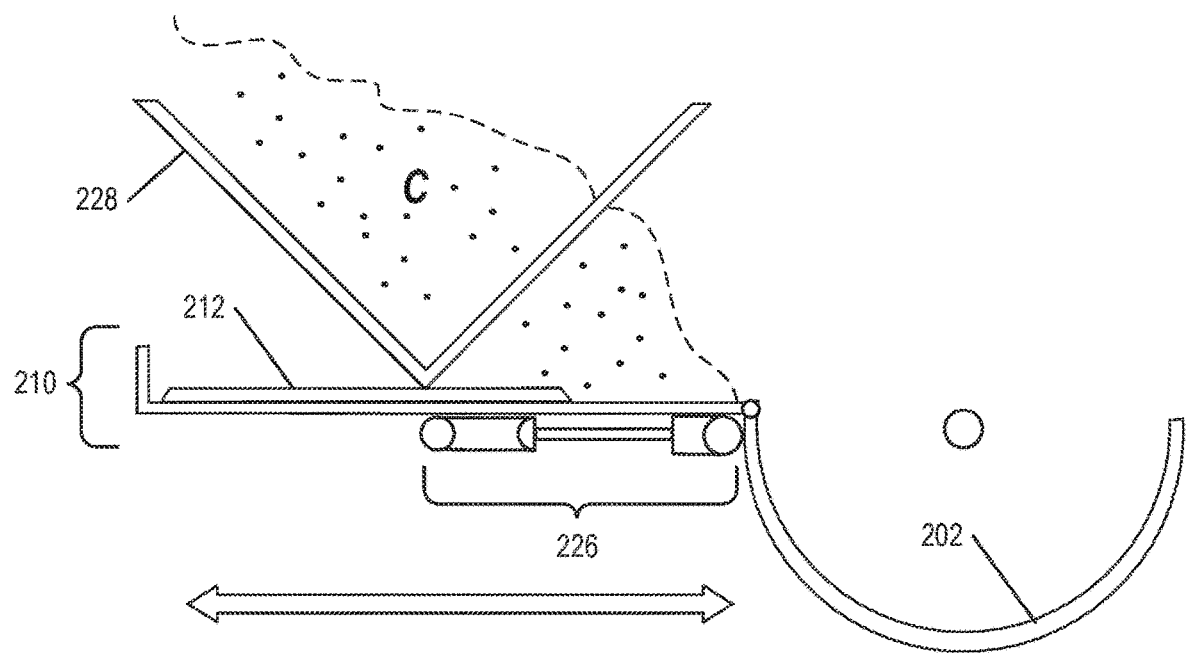
FIGS. 7A-7D are a progression of schematic views illustrating the delivery of concrete or other material to an augmented hopper, with the transfer of such material aided by the sliding plate, according to aspects of the present disclosure.

FIGS. 7A-7D are a progression of schematic views illustrating the delivery of concrete or other material to an augmented hopper auger trough. FIG. 7A shows a bolus of concrete or other discharged material C sitting on a gate 210 and sliding plate 212, having reached a natural angle of repose. In this position of repose, even with additional vibration, the discharged material C will generally not fall into the auger trough. The discharged material C is shown being dumped out of a truck bed 228. Further shown is an actuator system 226 that is mechanically coupled to a post structure (as seen in FIGS. 6A and 6B) with the sliding plate 212 shown in a retracted position, such that the sliding plate 212 is biased toward the outward (receiving) edge of the gate 210. The double-headed arrow here indicates the reciprocal direction and range of motion of the sliding plate 212 that forms a part of the top surface of the gate 210, where that range of motion is based on the extension and retraction of the actuator system 226. In many aspects, the actuator system 226 can be a hydraulic actuator, while in other aspects the actuator system 226 can be a linear actuator, a stepper motor, based on a slew drive, or the like.

Figure 7B:
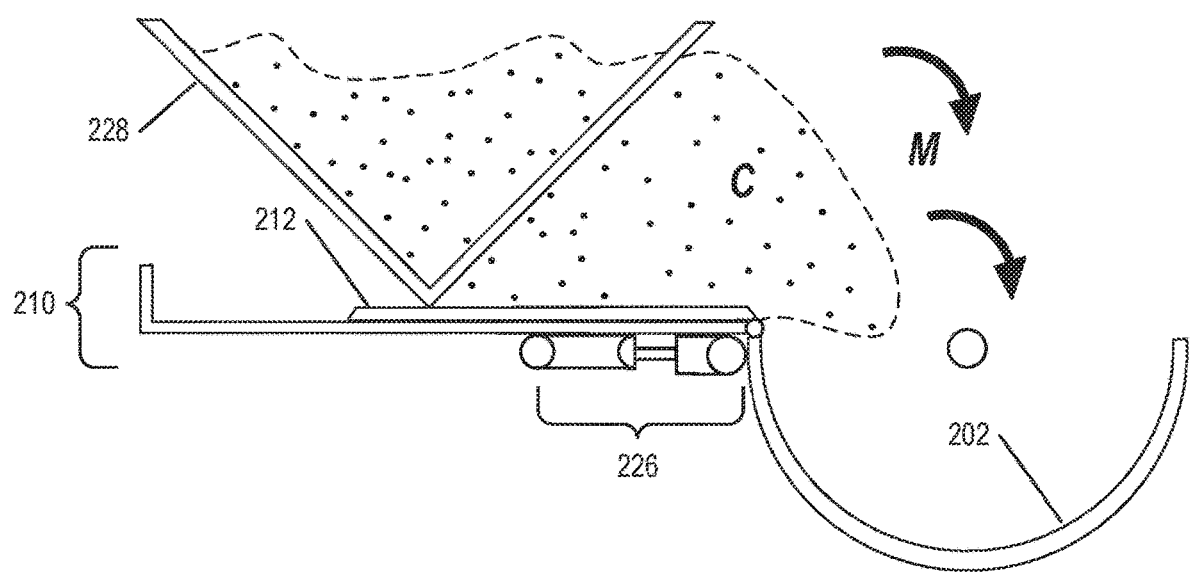

FIG. 7B shows the sliding plate 212 having moved toward the auger trough formed by the back wall 202 of the augmented hopper 200, carrying the bolus of discharged material C with it. The sliding plate 212 and the actuator system 226 are shown in an extended position, such that the sliding plate 212 is biased toward the inward (hopper) edge of the gate 210. The curved arrows here indicate the moment M of the discharged material C, now in a position to fall into the auger trough of the augmented hopper due to gravity.

Figure 7C:
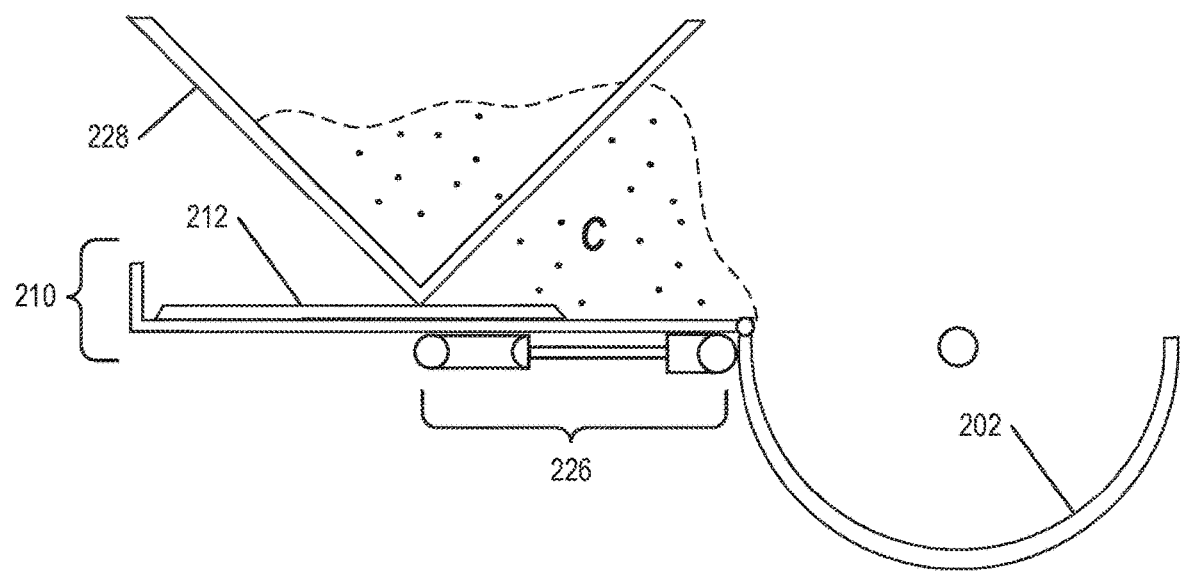

FIG. 7C shows the sliding plate 212, corresponding to the movement of the actuator system 226, moved back into a retracted position, getting under further discharged material C that remains on the gate 210. Further discharge of the truck contents is made possible in part because of the previous extension of the sliding plate (pushing concrete or other material sitting on top of the gate 210 over into the auger trough) made room for more material to discharge out of the truck dump bed onto the gate 210. As noted above, triangular projections 216 on the upper surface of the sliding plate 212 can wedge through the discharged material C. Further, the actuator system 226 can reciprocally move back and forth at a frequency that creates a vibration. This vibration can aid to shake and move the discharged material C downward toward the auger trough of the augmented hopper 200 and/or aid getting the sliding plate 212 further underneath the discharged material C.

Figure 7D:
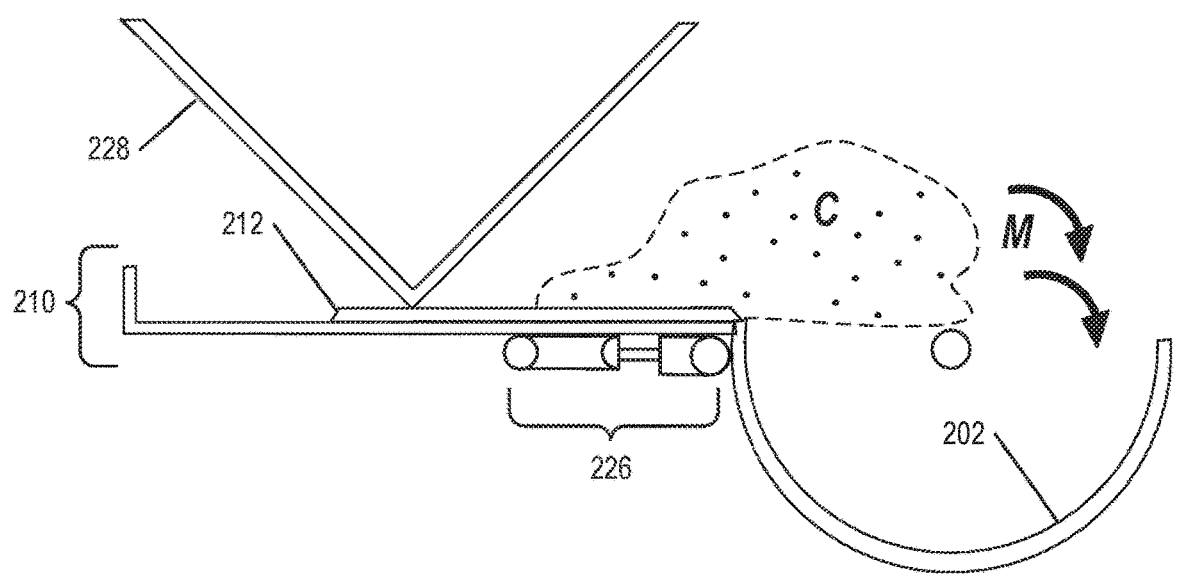

FIG. 7D shows the sliding plate 212, corresponding to the movement of the actuator system 226, again extended, having pushed, pulled, and/or vibrated the remaining discharged material C out of the truck dump bed, to a point where the discharged material C will have a moment M that will tend to fall into the augmented hopper. The actuator system 226 can also vibrate in the extended position, or the gate 210 can be vibrated via vibrators 221, further aiding in unloading the discharged material C into the augmented hopper trough.

FIGS. 8A and 8B are schematic illustrations of an augmented hopper 200 receiving material C from a truck T, the truck T having a pivot point at the back end of the truck bed/truck chassis. In FIG. 8A, the gate 210 is in a lowered position, with the bumper structure 214 engaged with the wheels of the truck T. In FIG. 8B, the gate 210 is raised up, and correspondingly the sealing lip 213 on the end of the gate 210 is raised up and in contact with the underside of the dump bed, that physical contact working to prevent spillage of material C onto the ground when the dump bed of the truck T is elevated. The gate 210 can be pivotally raised up to an angle of about 60°, however, in many working implementations, the gate 210 will only need to be raised up by an angle in the range of from 5° to 25°, or to any increment or gradient of angle within that range (e.g., 13°, 16°, 19°, etc.). Various trucks can have their dump bed pivotally raise at a variety of angles, even up to 90°. In many working applications, a truck T will pivotally raise its dump bed at an angle sufficient to have material C begin to fall off the back of the dump bed. Such working angles for elevating the dump bed of the truck can be from 5° to 55° or any increment or gradient of angle within that range (e.g., 15°, 35°, 51°, etc.). The material C from the truck T is received by the augmented hopper 200 in the auger trough generally bounded by the back wall 202 and the side walls 208, where the material C is then pushed through by the auger 204 to a distribution portion of the material placer.

Figure 9A:
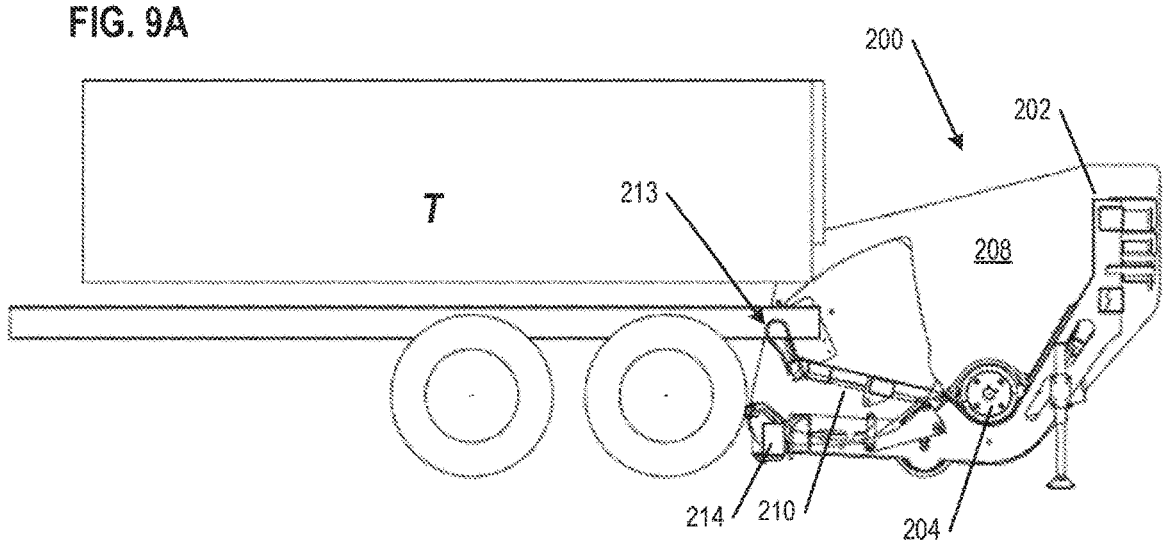
FIGS. 9A and 9B are schematic illustrations of an augmented hopper receiving material from a truck, the truck having a pivot point above the back end of the truck bed, according to aspects of the present disclosure.
Figure 9B:
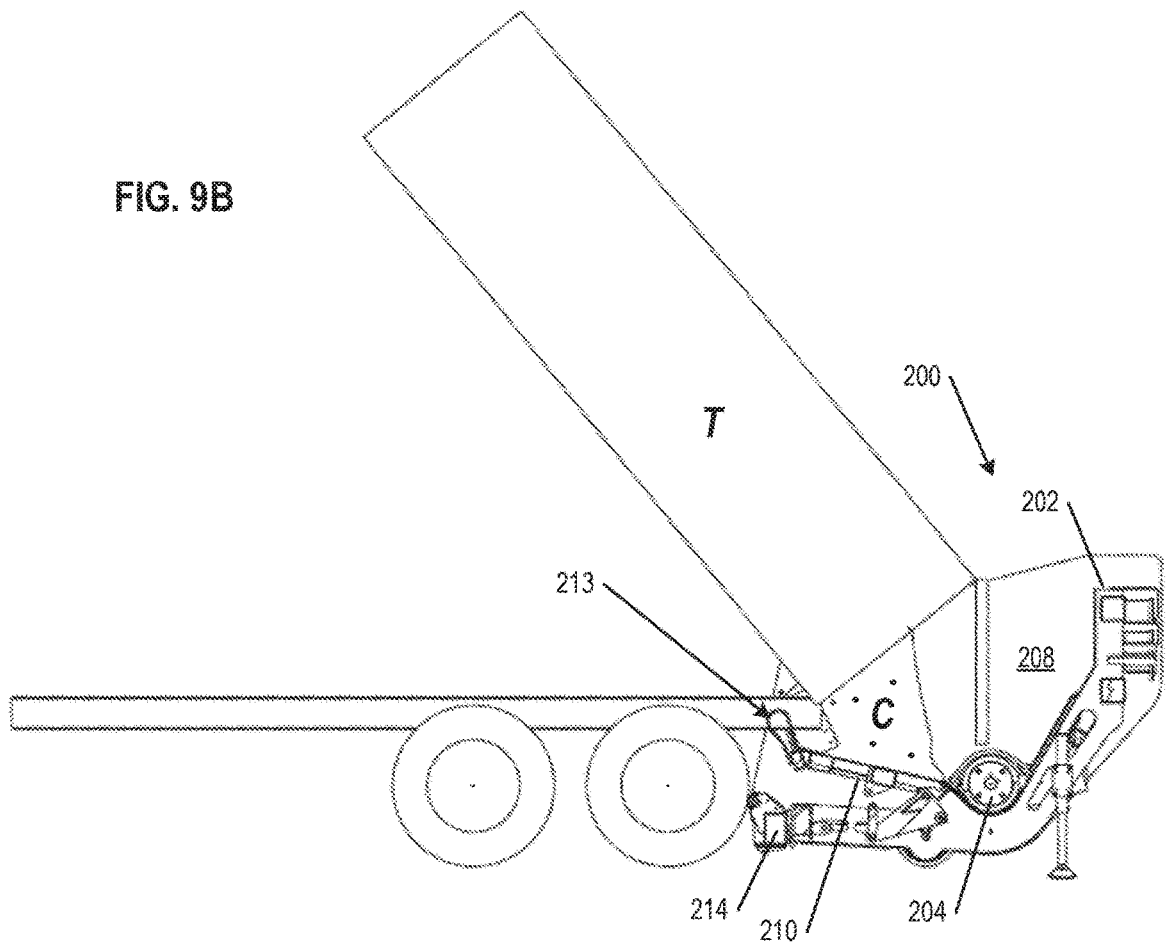

FIGS. 9A and 9B are schematic illustrations of an augmented hopper receiving material C from a truck 7, the truck T having a pivot point at the back end of the truck bed/truck chassis. In FIG. 9A, the gate 210 is in a lowered position, with the bumper structure 214 engaged with the wheels of the truck 7'. The gate 210 is also raised up, and correspondingly the sealing lip 213 on the end of the gate 210 is raised up and in contact with the underside of the rear frame of the truck chassis, that physical contact working to prevent spillage of material C onto the ground when the dump bed of the truck T is elevated. In FIG. 9B, the sealing lip 213 of the gate 210 remains in physical contact with the underside of the rear frame of the truck chassis as the truck dump bed elevates to an unloading angle. The gate 210 can be pivotally raised up to an angle of about 60°, however, in many working implementations, the gate 210 will only need to be raised up by an angle in the range of from 5° to 25°, or to any increment or gradient of angle within that range (e.g., 12°, 18°, 22°, etc.). Various trucks can have their dump bed pivotally raise at a variety of angles, even up to 90°. In many working applications, a truck T will pivotally raise its dump bed at an angle sufficient to have material C begin to fall off the back of the dump bed. Such working angles for elevating the dump bed of the truck can be from 5 to 55° or any increment or gradient of angle within that range (e.g., 14°, 25°, 40°, etc.). The material C from the truck T is received by the augmented hopper 200 in the auger trough generally bounded by the back wall 202 and the side walls 208, where the material C is then pushed through by the auger 204 to a distribution portion of the material placer.

Figure 10:
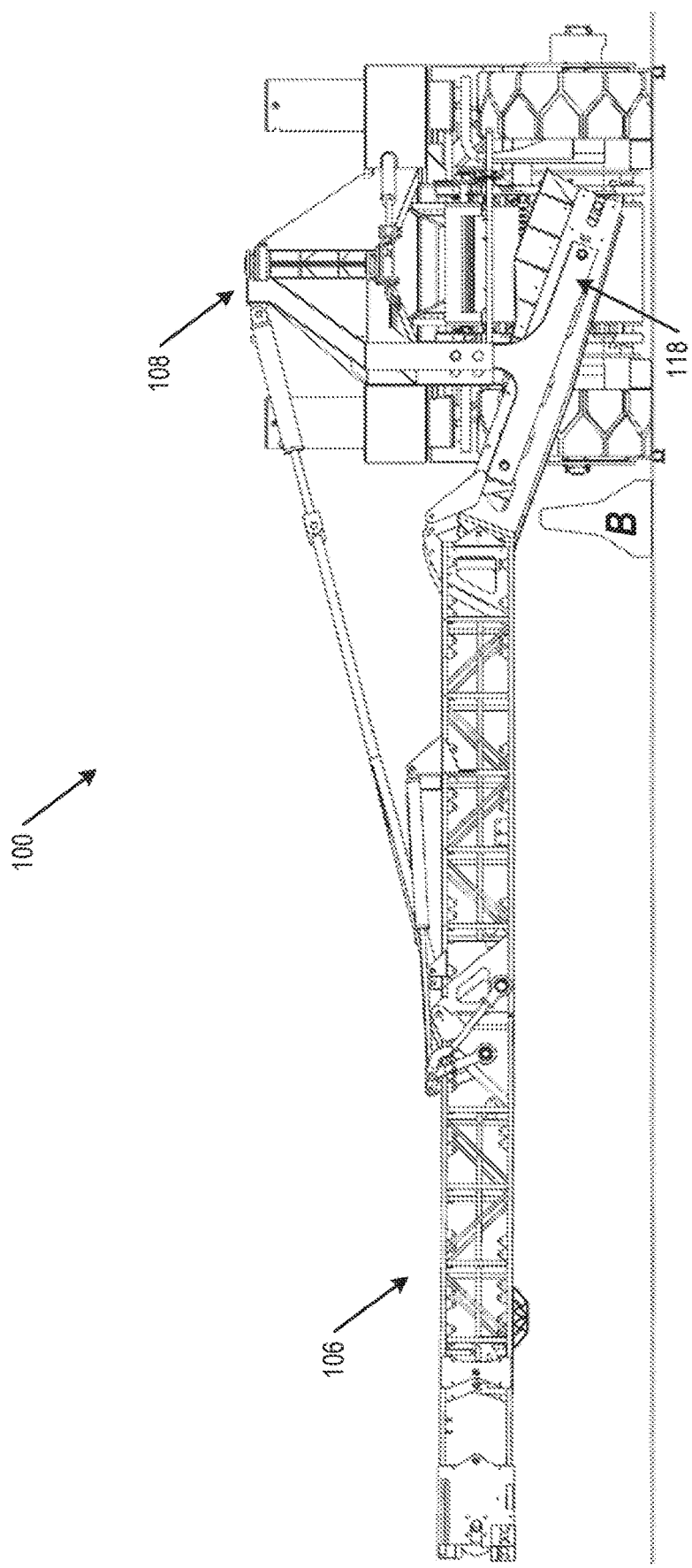
FIG. 10 is an exemplary illustration of a material placer with a distribution arm extending over a barrier, according to aspects of the present disclosure.

FIG. 10 is an exemplary illustration of a material placer 100 with a distribution conveyor 106 extending over a barrier B. The distribution conveyor 106 is shown as positioned with the pivoting yoke 108 at an angle effectively perpendicular (90°) to the moving direction of the material placer 100. The distribution conveyor 106 is further positioned to receive material from the transfer conveyor 118 in the central module of the material placer 100, the transfer conveyor receiving material from an augmented hopper on the rear side (not seen in this view) of the material placer 100. Internal to the material placer, the transfer conveyor 118 can be oriented at an angle up to 90° relative the passageway of the augmented hopper from which the transfer conveyor receives concrete or other material. The material placer 100 can function at operational speed with the distribution conveyor 106 extending over obstacles, like the barrier B, while concurrently receiving concrete or other material in the augmented hopper. Because of the capacity and efficiency of the augmented hopper, the material placer 100 can move without excessive stopping and restarting to reload the hopper. In other words, the material placer 100 can push a truck, providing the brakes of the truck are not engaged.

It should be appreciated that the material placer can include a control system having one or more microprocessors/processing devices that can further be a component of the overall apparatus. The control system is generally mounted on the material placer and can also include a display interface and/or operational controls configured to be handled by a user to guide the material placer, to change configurations of the material placer, and to operate the material placers, and sub-portions thereof. Alternative implementations of a control system can be though a remote processing device, or a general purpose computer with specific instructions for operation of the material placer and its augmented hopper. Such processing devices can be communicatively coupled to a non-volatile memory device via a bus. The non-volatile memory device may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium or memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C#, Java, Python, Perl, JavaScript, etc.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

What is claimed is:

1. A gate assembly for an augmented hopper, configured to receive material comprising concrete or other materials, the gate assembly comprising:
    a gate configured to be coupled to and pivot relative to an auger trough of the augmented hopper about a pivot axis, wherein the auger trough contains an auger;
    a sliding plate slidably coupled to the gate and configured so that the sliding plate pivots relative to the auger trough with the gate and so that the sliding plate is translatable relative to the gate in a sliding direction perpendicular to the pivot axis; and
    an actuation system mechanically coupled between the gate and the sliding plate, wherein the actuation system is configured to reciprocate the sliding plate back and forth in the sliding direction in order to move the material received onto the gate assembly into the auger trough toward the auger.

2. The gate assembly of claim 1, further comprising one or more vibrators coupled to the gate and configured to vibrate the sliding plate in order to further move the material received onto the gate assembly into the auger trough toward the auger.

3. The gate assembly of claim 1, wherein the gate further comprises a sealing lip configured to pivot with the gate and press up against a bed or a chassis of a truck and prevent spillage of material between the bed or chassis of the truck and the gate.

4. The gate assembly of claim 1, wherein the actuation system is further configured to vibrate the sliding plate before, during, or after reciprocating the sliding plate.

5. The gate assembly of claim 1, wherein the gate defines a slot extending perpendicularly to the pivot axis,
    wherein a post extends from the sliding plate and passes through the slot, and
    wherein the actuation system is coupled to the post on an opposite side of the gate as the sliding plate.

6. The gate assembly of claim 5, wherein the actuation system comprises at least one of a hydraulic actuator, a linear actuator, a stepper motor, and a slew drive.

7. The gate assembly of claim 5, wherein the actuation system is configured to have dual functionality of a sliding mode wherein the sliding plate is reciprocated back and forth along a length of the slot, and a vibrating mode wherein the sliding plate is reciprocated a shorter distance at a faster rate than the sliding mode.

8. The gate assembly of claim 7, further comprising one or more vibrators coupled to the sliding plate and configured to vibrate the sliding plate in order to further move the material received onto the gate assembly into the auger trough toward the auger.

9. The gate assembly of claim 7, further comprising one or more vibrators coupled to the gate and configured to vibrate the sliding plate in order to further move the material received onto the gate assembly into the auger trough toward the auger.

10. The gate assembly of claim 9, wherein the one or more vibrators are further configured to vibrate the sliding plate before, during, or after reciprocation of the sliding plate by the actuation system.

11. The gate assembly of claim 1, wherein the sliding plate comprises one or more projections configured to have a higher resistance when the sliding plate is moving toward the auger trough than away from the auger trough in order to move the material received onto the gate assembly into the auger trough toward the auger when the sliding plate is reciprocating.

12. The gate assembly of claim 11, wherein the one or more projections are triangular.

13. The gate assembly of claim 11, wherein the one or more projections each define a rectangular edge surface facing toward the pivot axis and configured to push material received onto the gate assembly into the auger trough toward the auger while the sliding plate is reciprocated.

* * * * *